United States Patent
Ghuman

(10) Patent No.: US 11,271,670 B1
(45) Date of Patent: Mar. 8, 2022

(54) C AND L BAND OPTICAL COMMUNICATIONS MODULE LINK EXTENDER, AND RELATED SYSTEMS AND METHODS

(71) Applicant: Cox Communications, Inc., Atlanta, GA (US)

(72) Inventor: Harjinder S. Ghuman, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 16/950,814

(22) Filed: Nov. 17, 2020

(51) Int. Cl.
| H04J 14/02 | (2006.01) |
| H04B 10/25 | (2013.01) |
| H04B 10/275 | (2013.01) |
| H04Q 11/00 | (2006.01) |

(52) U.S. Cl.
CPC .......... *H04J 14/0228* (2013.01); *H04B 10/25* (2013.01); *H04B 10/2755* (2013.01); *H04J 14/0283* (2013.01); *H04J 14/02* (2013.01); *H04J 14/023* (2013.01); *H04J 14/0239* (2013.01); *H04J 14/0242* (2013.01); *H04Q 2011/0016* (2013.01)

(58) Field of Classification Search
CPC ............... H04J 14/0228; H04J 14/0283; H04J 14/0242; H04J 14/023; H04J 14/0239; H04J 14/02; H04B 10/2755; H04B 10/25; H04Q 2011/0016
USPC .................................................. 398/43–103
See application file for complete search history.

(56) References Cited

U.S. PATENT DOCUMENTS

| 5,663,818 A | 9/1997 | Yamamoto et al. |
| 5,664,131 A * | 9/1997 | Sugiya ................ H01S 3/13013 |
| | | 359/337.13 |
| 5,742,416 A | 4/1998 | Mizrahi |
| | | (Continued) |

OTHER PUBLICATIONS

Harj et al, Coherent Access Applications for MSOs, Oct. 2018, SCTE•ISBE, All Document. (Year: 2018).*

(Continued)

*Primary Examiner* — Dibson J Sanchez
(74) *Attorney, Agent, or Firm* — Eversheds Sutherland (US) LLP

(57) ABSTRACT

This disclosure describes C and L band optical communications module link extender, and related systems and methods. An example method may include receiving, by a dense wave division multiplexer (DWDM) at a headend, one or more optical data signals over only an L band. The example method may also include combining the one or more optical data signals. The example method may also include outputting the combined one or more optical data signals to a first WDM at the headend. The example method may also include outputting, by a first WDM, the one or more optical data signals to an amplifier at the headend. The example method may also include amplifying, by the amplifier, the one or more optical data signals. The example method may also include outputting the amplified one or more optical data signals to a coexistence filter. The example method may also include outputting, by the coexistence filter, the amplified one or more optical data signals to an optical switch. The example method may also include outputting, by the optical switch, an egress optical data signal to a first fiber.

10 Claims, 9 Drawing Sheets

(56) References Cited

U.S. PATENT DOCUMENTS

| | | | |
|---|---|---|---|
| 5,995,256 A | 11/1999 | Fee | |
| 5,995,259 A | 11/1999 | Meli et al. | |
| 5,995,274 A * | 11/1999 | Sugaya | H01S 3/13013 359/337 |
| 6,310,716 B1 * | 10/2001 | Evans | H01S 3/302 359/334 |
| 6,323,994 B1 | 11/2001 | Li et al. | |
| 6,392,790 B1 | 5/2002 | Lauder et al. | |
| 6,414,769 B1 | 7/2002 | Meli et al. | |
| 6,483,636 B1 * | 11/2002 | Sugaya | H01S 3/0677 359/349 |
| 6,493,133 B1 | 12/2002 | Liang et al. | |
| 6,509,987 B1 * | 1/2003 | Hunziker | H04B 10/291 398/157 |
| 6,519,060 B1 | 2/2003 | Liu | |
| 6,570,703 B2 | 5/2003 | Murakami et al. | |
| 6,580,548 B2 * | 6/2003 | Islam | H01S 3/302 359/334 |
| 6,606,427 B1 | 8/2003 | Graves et al. | |
| 6,810,214 B2 * | 10/2004 | Chbat | H04B 10/2941 359/337 |
| 6,961,522 B1 | 11/2005 | Castagnetti et al. | |
| 6,973,268 B1 * | 12/2005 | Thompson | H04B 10/2589 398/42 |
| 7,106,969 B1 | 9/2006 | Lichtman et al. | |
| 7,239,772 B2 | 7/2007 | Wang et al. | |
| 7,505,687 B2 | 3/2009 | Jaggi et al. | |
| 7,509,048 B2 | 3/2009 | Turpin et al. | |
| 7,565,081 B1 | 7/2009 | Britz et al. | |
| 7,773,838 B2 | 8/2010 | Lee et al. | |
| 7,796,886 B2 | 9/2010 | Jaggi et al. | |
| 7,805,073 B2 | 9/2010 | Sabat et al. | |
| 8,116,629 B2 | 2/2012 | Boduch et al. | |
| RE43,403 E | 5/2012 | Jaggi et al. | |
| 8,238,751 B1 | 8/2012 | Iannone et al. | |
| 8,320,759 B2 | 11/2012 | Boduch | |
| 8,873,963 B2 | 10/2014 | Handelman | |
| 8,897,639 B2 | 11/2014 | Trojer et al. | |
| 9,014,557 B2 | 4/2015 | Graves et al. | |
| 9,172,492 B2 | 10/2015 | Lee | |
| 10,211,920 B1 | 2/2019 | Khaleghi et al. | |
| 10,541,774 B1 | 1/2020 | Dai | |
| 10,750,256 B1 * | 8/2020 | Moore | H04J 14/0289 |
| 2001/0015843 A1 | 8/2001 | Miyauchi et al. | |
| 2001/0019449 A1 | 9/2001 | Krummrich | |
| 2002/0000346 A1 | 1/2002 | Baranda et al. | |
| 2002/0003646 A1 | 1/2002 | Ishikawa | |
| 2002/0024706 A1 | 2/2002 | Meli | |
| 2002/0048066 A1 | 4/2002 | Antoniades et al. | |
| 2002/0089719 A1 | 7/2002 | Joo et al. | |
| 2002/0141046 A1 * | 10/2002 | Joo | H04B 10/2971 359/341.2 |
| 2002/0163691 A1 | 11/2002 | Wong et al. | |
| 2002/0181048 A1 | 12/2002 | Kuykendall et al. | |
| 2003/0076560 A1 * | 4/2003 | Pratt | H04B 10/272 398/79 |
| 2003/0142978 A1 | 7/2003 | Lee et al. | |
| 2003/0194242 A1 | 10/2003 | Miyauchi et al. | |
| 2004/0184804 A1 | 9/2004 | Shahar | |
| 2004/0252996 A1 | 12/2004 | McNicol | |
| 2005/0141892 A1 | 6/2005 | Park et al. | |
| 2005/0158049 A1 | 7/2005 | Lee et al. | |
| 2005/0286896 A1 | 12/2005 | Kinoshita et al. | |
| 2006/0045528 A1 | 3/2006 | Gumaste et al. | |
| 2006/0104638 A1 | 5/2006 | Chung et al. | |
| 2006/0165412 A1 | 7/2006 | Jung et al. | |
| 2006/0239609 A1 * | 10/2006 | Sorin | H04J 14/025 385/24 |
| 2007/0019956 A1 | 1/2007 | Sorin et al. | |
| 2007/0212072 A1 | 9/2007 | Iannone et al. | |
| 2008/0089684 A1 | 4/2008 | Smith et al. | |
| 2009/0010648 A1 | 1/2009 | Zuhdi et al. | |
| 2009/0074417 A1 | 3/2009 | Vassilieva et al. | |
| 2009/0129774 A1 | 5/2009 | Jaggi et al. | |
| 2009/0208212 A1 | 8/2009 | Lee et al. | |
| 2009/0220231 A1 | 9/2009 | Zimmel et al. | |
| 2009/0297152 A1 | 12/2009 | Bainbridge et al. | |
| 2010/0046946 A1 | 2/2010 | Cao et al. | |
| 2010/0046950 A1 * | 2/2010 | Cao | H04B 10/506 398/79 |
| 2010/0054740 A1 | 3/2010 | Lee et al. | |
| 2010/0119223 A1 | 5/2010 | Ferrari et al. | |
| 2010/0189442 A1 | 7/2010 | Grobe | |
| 2010/0239257 A1 | 9/2010 | Grossman et al. | |
| 2010/0266283 A1 | 10/2010 | Beckett | |
| 2010/0278535 A1 | 11/2010 | Kim | |
| 2010/0316386 A1 | 12/2010 | Luk et al. | |
| 2011/0158650 A1 * | 6/2011 | Cavaliere | H04J 14/0227 398/79 |
| 2011/0299858 A1 | 12/2011 | Mazzini et al. | |
| 2012/0020668 A1 | 1/2012 | Trojer et al. | |
| 2012/0087648 A1 | 4/2012 | Gao et al. | |
| 2012/0148245 A1 | 6/2012 | Bowler et al. | |
| 2012/0315047 A1 | 12/2012 | Iannone et al. | |
| 2013/0039656 A1 | 2/2013 | Lam et al. | |
| 2013/0057948 A1 | 3/2013 | Simonneau et al. | |
| 2013/0084064 A1 | 4/2013 | Akasaka | |
| 2013/0266318 A1 | 10/2013 | Manaf et al. | |
| 2014/0099117 A1 | 4/2014 | Way | |
| 2014/0161446 A1 | 6/2014 | Lee et al. | |
| 2014/0233954 A1 | 8/2014 | Lee et al. | |
| 2015/0043919 A1 | 2/2015 | Handelman | |
| 2015/0139654 A1 | 5/2015 | Mandelbaum et al. | |
| 2015/0249314 A1 | 9/2015 | Onaka | |
| 2015/0249520 A1 | 9/2015 | Badar et al. | |
| 2015/0304033 A1 | 10/2015 | Giorgi et al. | |
| 2016/0087747 A1 | 3/2016 | Way | |
| 2016/0192043 A1 | 6/2016 | Shukunami et al. | |
| 2016/0197697 A1 * | 7/2016 | Bonk | H04B 10/27 398/58 |
| 2017/0134113 A1 | 5/2017 | Lam et al. | |
| 2017/0237483 A1 | 8/2017 | Barnard | |
| 2018/0212706 A1 | 7/2018 | Ghuman | |
| 2018/0261971 A1 * | 9/2018 | Yaman | H01S 3/0677 |
| 2019/0036802 A1 | 1/2019 | Kuttuva Jeyaram et al. | |
| 2019/0132049 A1 | 5/2019 | Cai et al. | |
| 2019/0140765 A1 | 5/2019 | Ghuman | |
| 2019/0181952 A1 | 6/2019 | Jia et al. | |
| 2019/0215091 A1 * | 7/2019 | Johansson | H04J 14/0221 |
| 2019/0386767 A1 * | 12/2019 | Yuki | H04J 14/0227 |
| 2020/0099546 A1 | 3/2020 | Haag et al. | |
| 2020/0153502 A1 * | 5/2020 | Buset | H04B 10/03 |

OTHER PUBLICATIONS

Bindhaiq et al, Recent development on time and wavelength-division multiplexed passive optical network, Jan. 2015, Optical Switching and Networking, vol. 15, All Document. (Year: 2015).*

Ghuman, H., "Coherent Access Applications for MSOs", SCTE/ISBE, 2018. (23 pages).

Bindhaiq, et al., Recent Development on Time and Wavelength-Division Multiplexed Passive Optical Network (TWDM-PON) for Next-Generation Passive Optical Network Stage 2 (NG-PON2), Optical Switching and Networking 15, 2015. (14 pages).

* cited by examiner

C AND L BAND OPTICAL COMMUNICATIONS MODULE LINK EXTENDER, AND RELATED SYSTEMS AND METHODS

FIELD OF INVENTION

This disclosure relates generally to the field of optical telecommunications and includes an integrated module with several sub-assemblies.

BACKGROUND

To understand the importance of optical networking, the capabilities of this technology have to be discussed in the context of the challenges faced by the telecommunications industry, and, in particular, service providers. Most U.S. networks were built using estimates that calculated bandwidth use by employing concentration ratios derived from classical engineering formulas for modeling network usage such as the Poisson process. Consequently, forecasts of the amount of bandwidth capacity needed for data networks were calculated on the presumption that a given individual would only use network bandwidth six minutes of each hour. These formulas did not factor in the amount of traffic generated by different devices accessing the Internet. With the advent of the Internet and the ever increasing number of devices (for example, facsimile machines, multiple phone lines, modems, teleconferencing equipment, mobile devices including smartphones, tablets, laptops, wearable devices, and Internet of Things (IoT) devices, etc.) accessing the Internet, there has been an average increase in Internet traffic of 300 percent year over year. Had these factors been included, a far different estimate would have emerged.

As a result of this growth of devices, a large amount of bandwidth capacity is needed to provide the services required by these devices. In the 1990s, some long-distance carriers increased their capacity (bandwidth) to 1.2 Gbps over a single optical fiber pair, which was a considerable upgrade at the time. At a transmission speed of one Gbps, one thousand books can be transmitted per second. However, today, if one million families in a city decided to view a video on a Website, then network transmission rates on the order of terabits are required. With a transmission rate of one terabit, it is possible to transmit 200 million simultaneous full-duplex phone calls or transmit the text from 300 years-worth of daily newspapers per second.

DETAILED DESCRIPTION

Figure 1A:
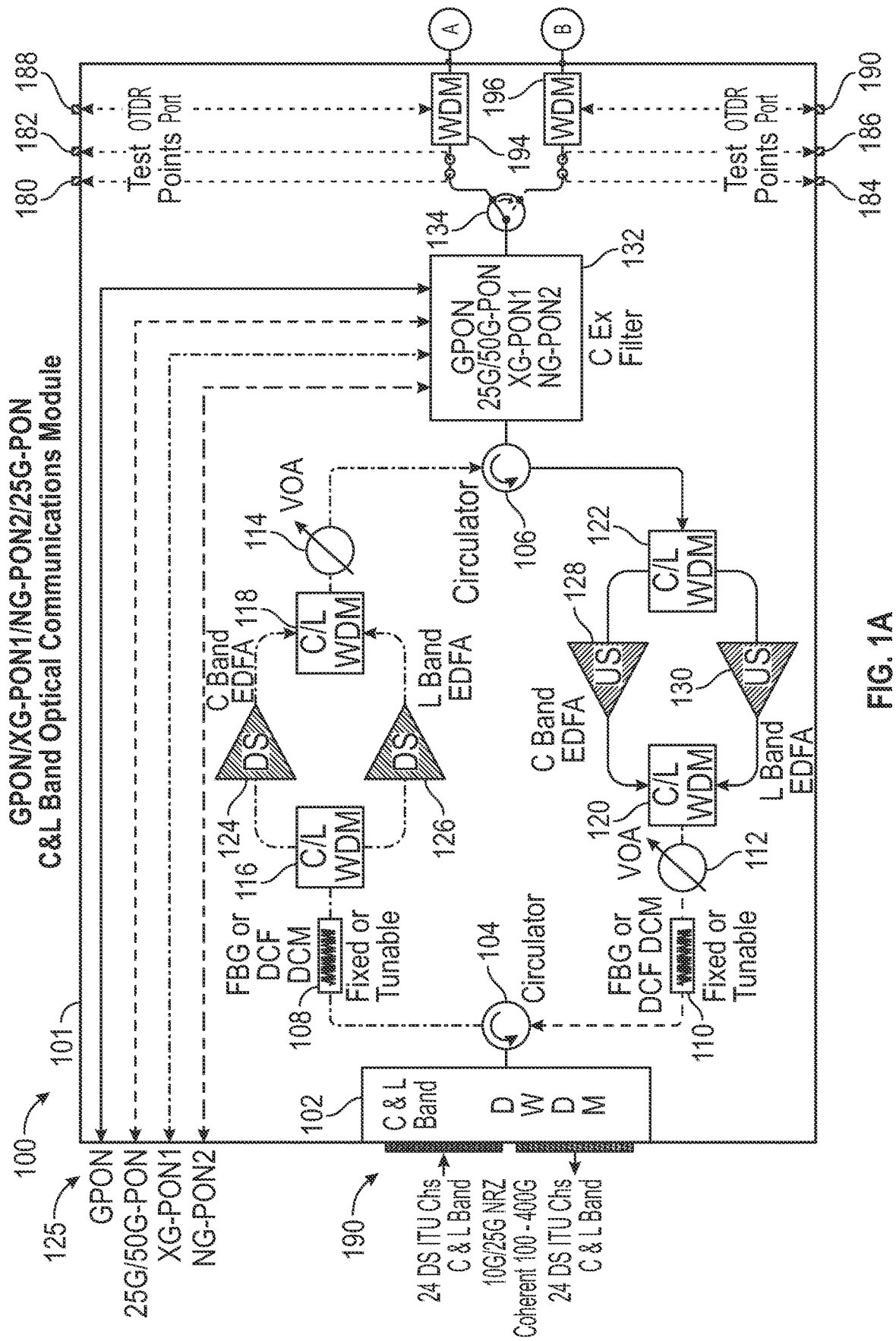
FIG. 1A depicts an example system architecture of an Optical Communications Module Link (OCML) Extender, in accordance with the disclosure.

The disclosure is directed to, among other things, C and L band optical communications module link extender, and related systems and methods. More particularly, the systems and methods described herein may pertain to an Optical Communications Module Link (OCML) Extender that may be configured to receive one or more different types of optical signals, including signals received on C and L bands. The OCML described herein may use the capabilities of both C and L band to provide a at least 24 wavelengths in each direction (for example, upstream and downstream) for Ethernet signals. The OCML may also incorporate NG-PON2 transport, which may use C and L band wavelengths as well, the use of L band as well as C band for Ethernet signals allows for the capabilities of the OCML to be maximized. NG-PON2 full standard uses eight C band wavelengths so we would lose eight Ethernet C band signals may be lost if L band Ethernet was not incorporated.

In some embodiments, the OCML headend may be used to transport a mix of multi-wavelength signals, which may include, for example, 10-400 GbE, GPON, XGPON/10GE-PON, 25G Non-return-to-zero (NRZ), 25G Quasi-Coherent, 25 and/or 50G Pulse-Amplitude Modulation (PAM4), 100-600G Coherent, and/or Duo-Binary signals, over the same optical fiber without having active devices such as optical amplifiers in the field. These are merely examples of signals that may be transported, and any other type of signal may also be transported as well. Throughout the disclosure reference may be made to any individual example signal or a combination of example signals, but any other type of signal could similarly be applicable. The OCML headend may also be configured to support the same wavelengths over a secondary optical fiber via an optical switch in case the primary optical fiber experiences a cut. In one embodiment, an OCML headend, systems, and methods may include various subsystems integrated into a single module including an integrated DWDM passive circuit that combines and separates bi-directional wavelengths in optical fibers propagating in a conventional wavelength window, such as the c band dispersive region of the optical fibers. The OCML headend may comprise one or more DWDMs, one or more circulators, one or more DCMs (which may be tunable DCMs), one or more VOAs, one or more WDMs, one or more amplifiers, one or more coexistence filtering elements, and one or more optical switches to feed a primary optical fiber or secondary (backup) optical fiber, (as well as any number of additional fibers). These elements of the OCML headend may be described further with respect to FIGS. 1-2.

In some embodiments, DWDM passive circuits can be used in combination with one or more other optical communications devices to develop novel signal extension circuits that increase the range with which light beams are propagated and the number of signals that can be combined and transmitted from a cable company to customers. The circuits disclosed herein may be referred to Optical Communications Module Link (OCML) Extender. The OCML passive circuits, disclosed herein, may increase the capacity of embedded optical fibers by first assigning incoming optical signals to specific frequencies (wavelength, denoted by lambda) within a designated frequency band and then multiplexing the resulting signals out onto one optical fiber. Because incoming signals are never terminated in the optical layer, the interface can be bit-rate and format independent, thereby allowing the service provider to integrate DWDM passive circuits easily into a passive circuit, such as an OCML passive circuit, with existing equipment in the network while gaining access to the untapped capacity in the embedded optical fibers.

A DWDM passive circuit may combine multiple optical signals for transportation over a single optical fiber, thereby increasing the capacity of a service provider's network. Each signal carried can be at a different rate (for example, optical carrier transmission rate OC-3, OC-12, OC-24, etc.) and in a different format (for example, SONET, ATM, data, etc.). For example, the networks disclosed herein may comprise DWDM passive circuits that transmit and receive a mix of SONET signals with different data rates (for example, OC-48 signals with a data rate of 2.5 Gbps or OC-192 signals with a data rate of 10 Gbps) can achieve data rates (capacities) of over 40 Gbps. The OCML passive circuits disclosed herein can achieve the aforementioned while maintaining the same degree of system performance, reliability, and robustness as current transport systems—or even surpassing it. The OCML passive circuits may be a smart platform, integrated into a network headend or a network cabinet, and may connect a metro area network that provides internet and telecommunications services to end users (for example, enterprise multi dwelling unit (MDU) customers, residential customers, commercial customers, and industrial customers) via one or more optical fiber links. The OCML passive circuits may also be referred to as OCML headends. The OCML headend may enable a plurality of signals to be cost effectively transported over long optical fiber distances between at least 5 km and 60 km (or any other distance) without having to put any optical amplifiers or other active devices, like an optical switch, (which is normally used to provide path redundancy in case of an optical fiber cut) in the field.

In some embodiments, a WDM may comprise one or more thin film filters (TFFs) or array waveguide gratings (AWGs) that combine one or more downstream signals into a single downstream signal and separate a single upstream signal into one or more upstream signals. The WDM may comprise one or more wavelength-converting transponders, wherein each of the wavelength-converting transponders receives an optical data signal from a client-layer optical network such as, for example, a Synchronous optical network (SONET)/synchronous digital hierarchy (SDH), Internet protocol (IP), and/or asynchronous transfer mode (ATM) optical network. Each of the wavelength-converting transponders converts the optical data signal into an electrical data signal, and then converts the electrical data signal into a second optical data signal to be emitted by a laser, wherein the second optical data signal is carried by one or more packets of light oscillating with wavelengths in the c band. More specifically, each of the wavelength-converting transponders may include a laser that emits the second optical data signal. That is each of the second optical data signals may be emitted by a laser with a unique wavelength. In some embodiments, the wavelength-converting transponders may comprise two adjacent transceivers. That is, each of the wavelength-converting transponders may comprise a first transceiver that converts the optical data signal into an electrical data signal, and may comprise second transceiver that converts the electrical data signal into the second optical data signal. The second transceiver converts the electrical signal to the second optical data signal such that the second optical data signal is transmitted with the correct wavelength.

In some embodiments, there may be two wavelength-converting transponders, and each of the two wavelength-converting transponders may include a laser emitting a second optical data signal with a unique wavelength. Thus, each of the wavelength-converting transponders converts the electrical data signal into an optical data signal, and each of the wavelength-converting transponders emits, or transmits, the optical data signal, with a wavelength in the c band, to a TFF or AWG. The TFF or AWG, may combine or multiplex the optical data signals, emitted by each of the wavelength-converting transponders, into a multi-wavelength optical data signal wherein each of the wavelengths in the multi-wavelength optical data signal coincide with the wavelengths associated with each of the optical data signals. Returning to the example above of the two wavelength-converting transponders, the first and second wavelength-converting transponders, may each receive an optical signal from a SONET/SDH client layer network. The first and second wavelength-converting transponders may each respectively convert the optical signal they received from the SONET/SDH client layer network into an electrical data signal. The first wavelength-converting transponder may convert the electrical data signal that it receives into a second optical data signal with a first wavelength. The first wavelength-converting transponder may emit, via a first laser, the second optical data signal, with the first wavelength, to the TFF or AWG. The second wavelength-converting transponder may convert the electrical data signal that it receives into a second optical data signal with a second wavelength. The second wavelength-converting transponder may emit, via a second laser, the second optical signal, with the second wavelength, to the TFF or AWG. The TFF or AWG may combine or multiplex the second optical data signal, with the first wavelength, and the second optical data signal, with the second wavelength, onto a multi-wavelength optical signal. The TFF or AWG may be referred to as an optical multiplexer.

In some embodiments, the DWDM passive circuits disclosed herein may include wavelength-converting transponders and corresponding WDMs that combine or multiplex optical data signals similar to the WDMs described above. The DWDM passive circuits may also include wavelength-converting transponders and corresponding WDMs that separate optical data signals. In some embodiments, the same WDM may combine optical data signals and separate optical data signals. That is, the WDM may separate one or more optical data signals from a multi-wavelength optical data signal, or demultiplex the one or more optical data signals from the multi-wavelength optical data signal. The WDM may separate the one or more optical data signals from a multi-wavelength optical data signal using a process that is the exact opposite of the process used to combine one or more optical data signals into a multi-wavelength signal. The WDM may separate one or more optical data signals from a multi-wavelength optical data signal that may correspond to an upstream signal received from a remote DWDM passive circuit.

In some embodiments, the WDM may receive the multi-wavelength optical data signal and one or more TTF or AWGs may separate the one or more optical data signals, from the multi-wavelength optical data signal, using filters or waveguide gratings with properties that separate optical data signals, with different wavelengths, from a multi-wavelength optical data signal. After the WDM has separated the optical data signals, with different wavelengths, from the multi-wavelength optical data signal, the WDM may convert each of the separated optical data signals to a corresponding electrical data signal. The WDM may then convert the corresponding electrical data signal to a second optical data signal, wherein the second optical data signal may be an optical data signal with signal characteristics commensurate for use with a SONET/SDH, IP, or ATM client-layer optical network.

As mentioned above, the WDM may also be a circulator, or function as a circulator. The circulator may be an optical circulator comprised of a fiber-optic component that can be used to separate upstream signals and downstream signals. The optical circulator may be a three-port or four-port device (or any other number of ports) in which an optical data signal entering one port will exit the next port. The optical circulator may be in the shape of a square, with a first port on the left side of the square, a second port on the right side of the square, and a third port on the bottom side of the square. A first optical data signal (for example, a downstream signal) entering the first port may exit the second port. A second optical data signal (for example, an upstream signal) entering the third port may exit the first port. In some instances, the circulator may also be round baud. The round baud circulator may allow for the use of at least 48 total signal channels (for example, at least 24 downstream and 24 upstream channels) of the OCML circuit. The circulator may a single stage circulator, or may be a dual stage circulator. The dual stage circulator may have higher isolation. The circulator may be beneficial in that it allows minimal wavelength separation between signals being transmitted. In particular, this may be beneficial with QuasiCoherent and PAM signals, for example.

An upstream signal, as referred to herein, may be a flow one or more packets of light, oscillating with a predetermined wavelength, along one or more optical fibers in a direction toward the OCML headend from a field hub or outside plant. A downstream signal, as referred to herein, may be a flow of one or more packets of light, oscillating with a predetermined wavelength, along one or more optical fibers in a direction away from the OCML headend and toward the field hub or outside plant. The one or more packets of light may correspond to one or more bits of data. Both downstream and upstream signals propagate along the same optical fiber, but in opposite directions. In some embodiments, the downstream and upstream signals may propagate along the same fiber simultaneously using one or more wavelength multiplexing techniques as explained below. This bidirectional simultaneous communication between the OCML headend and the outside plant may be referred to as a full duplex connection. Field hub and outside plant may be used interchangeably.

Figure 1A:
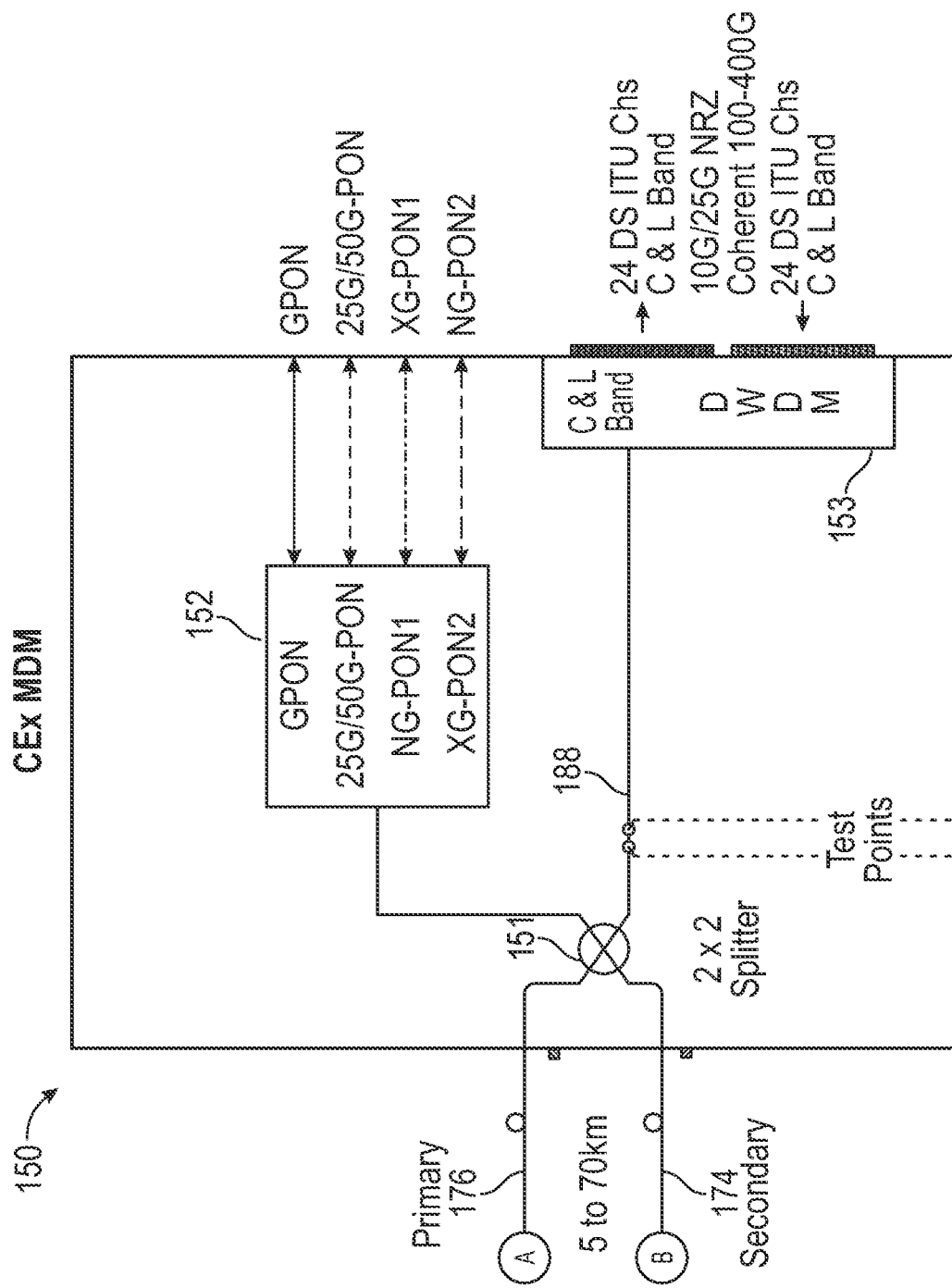

In some embodiments, the OCML headend may also comprise one or more booster optical amplifiers that may amplify downstream and/or upstream signals based on the length of a fiber between the OCML headend and the outside plant. In some instances, there may exist multiple booster optical amplifiers in the downstream direction. For example, there may exist one booster optical amplifier for amplifying signals in the C band and one booster optical amplifier for amplifying signals in the L band (for example, as shown in FIG. 1A). However, any other number of booster optical amplifiers may be used as well (for example, one booster optical amplifier may be used in the downstream direction in FIG. 2). The number of booster optical amplifiers used may depend on the wavelengths being used for signal transmissions (for example, FIG. 1A may depict a system in which both the C and L bands are used for downstream transmissions, whereas FIG. 2 may depict a system in which only one of the C and L bands are used for downstream transmissions).

In some instances, a booster optical amplifier may be a wide band booster optical amplifier. The booster optical amplifier may be an Erbium Doped Fiber Amplifier (EDFA). The core of the EDFA may be an erbium-doped optical fiber, which may be a single-mode fiber. The fiber may be pumped, by a laser, with one or more packets of light in a forward or backward direction (co-directional and coutnerdirectional pumping). As the one or more packets of light are pumped into the fiber erbium ions ($Er^{3+}$) may be excited and transition into a state where the ions can amplify the one or more packets of light with a wavelength within the 1.55 micrometers range. The EDFA may also comprise two or more optical isolators. The isolators may provent light pumped into the fiber that leaves the EDFA from returning to the EDFA or from damaging any other electrical components connected to the EDFA. In some embodiments, the EDFA may comprise fiber couplers and photodetectors to monitor optical power levels. In other embodiments, the EDFA may further comprise pump laser diodes with control electronics and gain flattening filters. The EDFA may have the effect of amplifying each of the one or more optical data signals, while they are combined in a multi-wavelength optical data signal, without introducing any effects of gain narrowing. In particular, the EDFA may simultaneously amplify the one or more optical data signals, each of which have a different wavelength, within a gain region of the EDFA. A gain of the booster optical amplifier may be based at least in part on the length of the fiber. In some embodiments, the length of the fiber may at least be between 5 and 60 kilometers.

The OCML headend may also comprise one or more optical pre-amplifiers that may amplify upstream signals. In some instances, an optical pre-amplifier may be a wide band booster optical amplifier. The optical pre-amplifier may also be an EDFA. The optical pre-amplifier may amplify upstream signals based on the length of the fiber between the outside plant and the OCML headend to account for any losses in the strength of the upstream signals propagating along the fiber. The gain of the optical pre-amplifier may be based, at least in part, on a required signal strength of the upstream signals at an input to the DWDM passive circuit, in order for the DWDM to demultiplex the upstream signals. The optical pre-amplifier may have the effect of amplifying a multi-wavelength optical data signal, so that the one or more optical data signals in the multi-wavelength optical data signal, each of which have different respective wavelengths, have a certain received power level at a DWDM passive circuit upstream input port Similar to the booster optical amplifiers in the downstream direction, there may exist multiple optical pre-amplifiers in the upstream direction. For example, there may exist one optical pre-amplifiers for amplifying signals in the C band and one optical preamplifiers for amplifying signals in the L band (for example, as shown in FIG. 1A). However, any other number of optical pre-amplifiers may be used as well (for example, one optical pre-amplifiers may be used in the upstream direction in FIG. 2). The number of optical pre-amplifiers used may depend on the wavelengths being used for signal transmissions (for example, FIG. 1A may depict a system in which both the C and L bands are used for upstream transmissions, whereas FIG. 2 may depict a system in which only one of the C and L bands are used for upstream transmissions).

The optical signal to noise ratio (OSNR) of the EDFA may be based at least in part on an input power to the EDFA, a noise figure. In some embodiments the OSNR of the EDFA may be determined by the expression OSNR=58 dB−NF−$P_{in}$, where NF is the noise floor, $P_{in}$ is the input power to the EDFA. 58 dB is constant that is based on Planck's constant, the speed of light, the bandwidth of the EDFA, and the wavelength of the one or more packets of light. In some embodiments, the OSNR of the EDFAs disclosed herein may be as high as 40 dB, for one or more packets of light that are transmitted downstream from OCML headend. The OSNR of the transceivers disclosed herein may be as low as 23 dB, and there may be a plurality of bit error rate (BER) values associated with this 23 dB OSNR. The BER may be determined based at least in part on the energy detected per bit, noise power spectral density, and a complementary error function. More specifically the BER may be $$\frac{1}{2}\mathrm{erfc}\left(\sqrt{\frac{E_b}{N_0}}\right),$$

wherein $E_b$ is the energy detected per bit, $N_0$ is the noise power spectral density, and erfc is the complementary error function. For instance, the transceivers disclosed herein may be able to achieve a BER of $10^{-12}$ when the common logarithm ratio of received power to 1 milliwatt (mW) is −23 dBm. For example, a transceiver in the OCML headend may receive an upstream flow or one or more packets of light, from a transceiver in the field hub or outside plant, that has a common logarithm ratio of received power per mW of −23 dBm. The BER may be greater for common logarithm ratios of received power per mW, meaning that the BER may decrease with the higher common logarithm ratios of received power per mW. The transceivers may be configured to have greater OSNRs, and therefore lower BERs for the same value of a common logarithm ratio of received power per mW. For example, a first transceiver configured to have an OSNR of 24 dB with a common logarithm ratio of received power per mW of −28 dBm may have an approximate BER of $10^{-5}$ and a second transceiver configured to have an OSNR of 26 dB with a common logarithm ratio of received power per mW of −28 dBm may have an approximate BER of $10^{-7}$. Thus, transceivers configured to have a higher OSNR results in the transceiver having a lower BER for the same common logarithm ratio of received power per mW. Both the booster optical amplifier and the optical pre-amplifier, as well as any other amplifiers described herein, may allow operation over a full transmission spectrum, which may include at least 48 transmission channels (at 100 GHz spacing) or 96 transmission channels at 50 GHz spacing The OCML headend may also comprise an optical switch that may connect a WDM, and/or any other element of the OCML circuit, to a primary optical fiber, which effectively may connect the OCML passive circuit to the outside plant. The optical switch may also connect the WDM, and/or any other element of the OCML circuit, to a secondary optical fiber connecting the OCML passive circuit to the outside plant. The optical switch may be in a first position that connects the WDM to the primary optical fiber, and may be in a second position that connects the WDM to the secondary optical fiber. The optical switch may be in the second position when the primary optical fiber is disconnected or unresponsive. Any number of additional optical fibers may be connected to the optical switch as well.

Because the OCML headend, field hub or outside plant, and fiber connecting the OCML headend and field hub or outside plant mainly comprise passive optical components, in comparison to other optical ring networks that primarily have active components, one or more devices may be needed to control for dispersion of light as it goes through different optical components. In particular, as packets of light traverse the different optical components in the OCML headend (for example, WDMs and/or optical amplifiers including booster amplifiers or pre-optical amplifiers), an optical data signal being carried by the packets of light may begin to experience temporal broadening which is a form of optical data signal distortion. Because the OCML systems disclosed herein transmit high data rate optical data signals, which may include at least hundreds of Gbps, there may be dispersive temporal broadening effects introduced by one or more of the optical components in the OCML headend. The optical data signals disclosed herein may carry digital symbols, which may include a series of binary digits (1 or 0), and each binary digit may be represented by a pulse of light (one or more packets of light) of a certain amplitude, that lasts a certain period. For example, an optical data signal may be carrying a plurality of digital symbols, wherein a pulse of light that has a certain amplitude and certain pulse width (certain period) represents each binary digit in a digital symbol of the plurality of digital symbols. The pulse widths of each of the pulses of light may begin to broaden as each of the pulses of light traverses different optical components. As a result, the symbol may begin to broaden. Consequently, each of the symbols begins to broaden over time, and may become indistinguishable from an adjacent symbol. This may be referred to as intersymbol interference (ISI), and can make it difficult for a fiber-optic sensor or photodetector receiving the optical data signal to distinguish adjacent symbols from one another.

In order to compensate for this phenomenon, one or more dispersion compensation modules (DCMs) may be inserted between one or more optical components in the OCML headend. For example, a DCM may be receive an optical data signal output from a circulator and/or any other element of the OCML circuit to compensate for any potential ISI that may be introduced as a result of different optical data signals, carried over pulses of light, that have been combined, multiplexed, or circulated in the circulator, or any other element of the OCML circuit. The DCM can also compensate for dispersion characteristics of the fiber between the OCML headend and the field hub or outside plant. In particular, the fiber may comprise certain optical elements or material impurities that can be compensated for in the DCM, wherein the DCM comprises long pieces of dispersion-shifted fibers or chirped fiber Bragg gratings. The dispersion-shifted fibers or chirped fiber Bragg gratings can reduce ISI that is introduced by the fiber. In some embodiments, the OCML headend may comprise one or more DCMs to compensate for ISI that may be introduced by one or more optical components in the OCML headend or fiber that is either upstream or downstream from the one or more DCMs. For example, in one embodiment, a first DCM may be positioned downstream from a first WDM and a second DCM may be positioned upstream from a second DCM. Additionally, the DCMs may be tunable. That is, the DCMs can be tuned based on the transmission distance of a signal. For example, if a signal is being transmitted over a 60 km fiber, the tunable DCM would be tuned differently than if the signal were being transmitted over a 5 km fiber. It should be noted that the DCMs may cause negative dispersion for shorter lengths of fiber (for example, lengths of fiber less than 5 kilometers). Negative dispersion may occur when a flow of one or more packets of light, forming a wave, propagate along a distance of the fiber with a negative rate of change. The wave propagates along the fiber, and the wave has an electric field associated with it that is normal to the direction of propagation of the wave, and a magnetic field associated with it that is normal to the electric field and the direction of propagation of the wave. The wave propagates along the fiber with an angular frequency, w, which may be a function of a propagation constant β. The electric and magnetic fields may both oscillate in accordance with sinusoidal function $e^{i(\beta z - \omega t)}$, wherein z is a distance that the wave has traveled in the fiber, and t is the time elapsed after the wave has been transmitted by the DCM. That is the electric and magnetic field may oscillate in accordance with a sinusoidal function equal to cos(βz−ωt)+i sin(βz−ωt), wherein the oscillation of the wave is based at least in part on the propagation constant, and angular frequency, and the amount of time that has elapsed since the wave has been transmitted by the DCM. The angular frequency may be reciprocal of the amount of time that the electric and magnetic fields oscillate an entire cycle or period. The propagation constant may be a complex quantity, wherein the real part of the propagation constant is a measure of a change in the attenuation of the wave as it propagates along the fiber. The real part of the propagation constant may be referred to as an attenuation constant. The imaginary part of the propagation constant is a measure of a change in the phase of the wave as it propagates along the fiber. Because the angular frequency may be based at least in part on the propagation constant, the angular frequency of the wave may change as the attenuation and phase of the wave change. Accordingly, the velocity of the wave may change as it propagates along the fiber and may begin to experience dispersion. The velocity of the wave may be the rate at which the angular frequency changes as the propagation constant changes while the wave propagates along the fiber. That is the velocity of the wave may be expressed as $$v = \frac{d\omega}{d\beta}.$$

The wavelength of the wave may be expressed as $$\lambda = 2\pi \frac{c}{\omega},$$

wherein c is the speed of light. The dispersion of the wave may be based at least in part on the speed of light, wavelength of the wave, velocity of the wave, and the rate of change of the velocity of the wave with respect to the angular frequency. The dispersion of the wave expressed as $$D = \frac{2\pi c}{v^2 \lambda^2} \frac{dv}{d\omega}.$$

D is a dispersion parameter of the wave and is based on the speed of light (c), the velocity of the wave (v), the wavelength of the wave (k), and the rate of change or first derivative of the velocity of the wave with respect to the angular frequency of the wave $$\left(\frac{dv}{d\omega}\right).$$

The dispersion parameter indicates whether the wave experiences positive dispersion (temporal broadening) or negative dispersion (temporal contraction) as the wave propagates along the fiber. Negative dispersion may occur when the rate of change or derivative of the velocity of the wave, with respect to the angular frequency is negative. When $$\left(\frac{dv}{d\omega}\right)$$

is negative, the wave is said to be experiencing negative dispersion. Thus when the rate of change of the velocity of the wave with respect to the angular frequency is negative, the wave may experience temporal contraction. Accordingly, transceivers in the transponders of the DWDM of the field hub or outside plant must be capable of detecting waves subject to negative dispersion. Negative dispersion is the opposite of positive dispersion in that ISI may not occur when a wave is detected at the transceivers in the transponders of the DWDM of the field hub or outside plant. However, temporal contraction of the wave may make it difficult for a fiber-optic sensor or photodetector to detect an optical data signal carrying digital symbols, because the digital symbols in the optical data signal may begin to overlap with one another. This may happen because each of the digital symbols are a series of binary digits, and the binary digits are represented by a pulse of light (one or more packets of light in the wave), and as the wave begins to experience negative dispersion, each of the binary digits may begin to overlap with one another. The transceivers disclosed herein are equipped with fiber-optic sensors or photodetectors that are capable of correctly detecting the one or more packets of light in the wave, when the wave is subject to positive and/or negative dispersion. The DCMs disclosed herein may transmit a signal a distance of at least 60 kilometers.

The OCML headend may also comprise a non-optical switch that switches due to a loss of light or on demand.

The OCML headend may also comprise wavelength-monitoring ports that connect to the primary and secondary optical fibers to monitor the wavelength of upstream signals comprising 10-400 GbE, GPON, XGPON/10GEPON, 25G Non-return-to-zero (NRZ), 25G Quasi-Coherent, 25 and/or 50G Pulse-Amplitude Modulation (PAM4), 100-600G Coherent, and/or Duo-Binary signals (and/or any other type of signal) and/or to monitor the wavelength of downstream signals comprising 10-400 GbE, GPON, and/or XGPON/10GEPON, 25G Non-return-to-zero (NRZ), 25G Quasi-Coherent, 25 and/or 50G Pulse-Amplitude Modulation (PAM4), 100-600G Coherent, and/or Duo-Binary signals (and/or any other type of signal).

Certain embodiments of the disclosure are directed to an OCML, systems, and methods. Embodiments of the disclosure now will be described more fully hereinafter with reference to the accompanying drawings, in which certain embodiments are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

It should be noted that the OCML headend may also be referred to as a terminal or Master Terminal Center (MTC). Throughout this disclosure reference may be made to a "Master Terminal Center" or "MTC" for simplicity, but these term could also be replaced by any other type of headend or central hub location in a network. In some embodiments, the OCML headend may be collocated within the MTC. In other embodiments, the OCML headend may be located at a secondary hub, for example, a secondary transport center (STC) that may be connected to the MTC via a network. As with the MTC, throughout this disclosure reference may be made to a "secondary transport center" or "STC" for simplicity, but these term could also be replaced by any other type of secondary hub location in a network. In some embodiments, an outside plant may also be referred to as a field hub or remote physical device (RPD). In some embodiments, the outside plant may be collocated with the RPD. In other embodiments, the outside plant and RPD may not be collocated and connected via a 10 Gigabit transceiver. The outside plant may comprise one or more passive optical network devices.

Example System Architectures

Turning to the figures, FIG. 1A depicts an example system 100 architecture of an OCML headend 101 according to at least one embodiment of the disclosure. As shown in FIG. 1A, OCML headend 101 may be a smart integrated OCML headend, which may be a circuit comprising one or more DWDMs (for example, DWDM 102), one or more circulators (for example, circulator 104 and 106), one or more DCMs (for example, DCM 108 and 110) (which may be tunable DCMs), one or more VOAs (for example, VOA 112 and/or VOA 114), one or more WDMs (for example, WDM 116, WDM 118, and WDM 120, and WDM 122), one or more amplifiers (for example, optical amplifier 124, optical amplifier 126, optical amplifier 128, and optical amplifier 130), one or more filtering elements 132, and one or more optical switches (for example, optical switch 134) to feed a primary optical fiber (for example, Primary Fiber 136) or secondary (backup) optical fiber (for example, Secondary Fiber 138) (as well as any number of additional fibers). The OCML headend 101 may provide a method for transporting multiple signals using the C band and L band of signal wavelengths. In some instances, the C band may refer to a range of wavelengths from, (1528.8 to 1566.3) and the L band may refer to a range of wavelengths from, 1568.77 to 1610.49, for example. Examples of signals that may be transported using these wavelength bands may include at least GPON/XGPON/10GEPON,25G/50G PON, 25G Non-return-to-zero (NRZ), 25G Quasi-Coherent, 25 and/or 50G Pulse-Amplitude Modulation (PAM4), 100-600G Coherent, and/or Duo-Binary signals (and/or any other type of signal) and a field hub or outside plant. The MTC facility may be an inside plant facility where a cable company acquires and combines services to be offered to customers. The MTC facility may provide these combined services to customers, by transmitting and receiving optical signals over a plurality of optical fibers to a field hub or outside plant which connects the plurality of optical fibers to a customer's premise. The OCML headend 101 may be located in a secondary terminal center (STC) that connects the MTC facility to a field hub or outside plant housing a multiplexer-demultiplexer (MDM) 150. The OCML headend 101 may also be located in the MTC or in any other location along a transmission path of the signals.

In some embodiments, OCML headend 101 may comprise at least twenty four downstream transponders 190 and at least twenty four upstream transponders 188 (as well as any other number of downstream and/or upstream transponders). The downstream transponders 190 may transmit downstream data over twenty four wavelengths. The upstream transponders 188 may receive upstream data over, such as, for example, GPON/XGPON/10GEPON, 25G Non-return-to-zero (NRZ), 25G Quasi-Coherent, 25 and/or 50G Pulse-Amplitude Modulation (PAM4), 100-600G Coherent, Duo-Binary, and/or any other type of signal. In some instances, twelve of the downstream transponders 190 may use the C band and twelve of the downstream transponders 190 may use the L band. Similarly, twelve of the upstream transponders 188 may use the C band and twelve of the upstream transponders 188 may use the L band (however, any other combination of numbers of wavelengths for the C and L bands may also be applicable as well). Additionally, the downstream and upstream signal wavelengths may be capable of transporting signals on adjacent channels, rather than using a block of channels for downstream transmission and a block of channels for upstream transmission, with a guard band of a particular number of wavelengths included between the two channel blocks. Alternatively, the downstream and upstream signal wavelengths may still be transmitted in separate blocks, however.

OCML headend 101 may also comprise one or more PON connectors 125, which may be used to transmit/receive any type of PON signal, such as, for example, GPON, XGPON, NG-PON2, 25G/50G-PON, and/or any other type of PON signal. OCML headend 101 may also comprise a primary optical fiber (for example, primary optical fiber 176) and a secondary optical fiber (for example, secondary optical fiber 174) that transmit and receive a plurality of optical signals. Primary optical fiber 176 and secondary optical fiber 174 may transmit a first plurality of signals from OCML headend 101 to an outside plant, and may receive a second plurality of signals from the outside plant. In some embodiments, any other number of optical fibers may be provided (for example, more than just the primary and secondary optical fibers).

In some embodiments, downstream transponders 190 and upstream transponders 188 may comprise connectors belonging to the laser shock hardening (LSH) family of connectors designed to transmit and receive optical data signals between DWDM 102, and one or more servers (not shown). In other embodiments, downstream transponders 190 and upstream transponders 188 may also comprise E2000 connectors, and may utilize a 1.25 millimeter (mm) ferrule. Downstream transponders 190 and upstream transponders 188 may be installed with a snap-in and push-pull latching mechanism, and may include a spring-loaded shutter which protects the ferrule from dust and scratches. The shutter may close automatically once the connector is disengaged, locking out impurities, which could later result in network failure, and locking in possibly damaging lasers. Downstream transponders 190 and upstream transponders 188 may operate in a single-mode or a multimode. In single mode, downstream transponders 190 and upstream transponders 188 only one mode of light may be allowed to propagate. Because of this, the number of light reflections created as the light passes through the core of single-mode downstream transponders 190 and upstream transponders 188 decreases, thereby lowering attenuation and creating the ability for the optical data signal to travel further. Single-mode may be for use in long-distance, higher bandwidth connections between one or more servers and DWDM 102.

In multimode, downstream transponders 190 and upstream transponders 188, may have a large diameter core that allows multiple modes of light to propagate. Because of this, the number of light reflections created as the light passes through the core increase, creating the ability for more data to pass through at a given time. Multimode downstream transponders 190 and upstream transponders 188, may generate high dispersion and an attenuation rate, which may reduce the quality of an optical data signal transmitted over longer distances. Therefore multimode may be used to transmit optical data signals over shorter distances. In some embodiments, the downstream transponders 190 and upstream transponders 188 may also comprise any other types of connectors as well.

In some embodiments, OCML headend 101 can transmit and receive up to at least twenty four bi-directional optical data signals (or more than twenty four signals in some instances), but the actual number of optical data signals may depend on operational needs. That is, OCML headend 101 can transport more or less than twenty four downstream optical signals, or more or less than twenty four upstream optical data signals, based on the needs of customers' networks. These customer networks may be connected to OCML headend 101 through an optical ring network (for example, a metro access optical ring network).

The operation of OCML headend 101 may be described by way of the processing of downstream optical data signals transmitted from OCML headend 101 to a field hub or outside plant, and the processing of upstream optical data signals received from the field hub or outside plant. In terms of downstream processing, each of the transponders of downstream transponders 190 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty four transponders in downstream transponders 190 may each receive a SONET/SDH optical data signal, and each of the twenty four transponders may convert the received SONET/SDH optical data signal into a corresponding second optical data signal, wherein each of the corresponding second optical data signals may have a unique wavelength. That is, the wavelength of each of the corresponding second optical data signals may be distinguishable from the wavelength of any of the other corresponding second optical data signals. Thus downstream transponders 190 may generate twenty four corresponding second optical data signals each of which has a unique wavelength.

DWDM 102 may receive the twenty four corresponding second optical data signals over the L and C bands as an input and output a multi-wavelength downstream optical data signal comprising the twenty four corresponding second optical data signals onto a fiber. More specifically, DWDM 102 may multiplex the twenty four corresponding second optical data signals onto the fiber, wherein the twenty four multiplexed corresponding second optical data signals compose the multi-wavelength downstream optical data signal. The multi-wavelength downstream optical data signal may have a wavelength comprising the twenty four wavelengths of the twenty four corresponding second optical data signals.

In some embodiments, the multi-wavelength downstream optical data signal, may be input to a circulator (e.g. circulator 104). The circulator 104 may allow additional optical wavelengths to be utilized (for example, the full array of wavelengths included in the 48 total channels) and may enable technologies such as Quasi-Coherent and PAM4 (where the DS and UP wavelengths may be closer together) to be transported in an OCML-MDM infrastructure. The circulator 104 may enable the use of the same wavelength for both downstream and upstream and upstream purposes. Circulators may be one-directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss; circulator 104 may be a round baud single or dual-stage circulator that receives the downstream optical signal from the DWDM 102 and outputs a corresponding downstream optical signal to DCM 108.

After being output by the circulator 104, the downstream optical data signal may be input into DCM 108 to compensate for dispersion that downstream optical data signal may experience. In some embodiments, DCM 108 may be configured to balance positive and/or negative dispersion that may be introduced to the egress optical data signal by the fiber. In some embodiments, DCM 108 may be configured to compensate for positive (temporal broadening of the egress optical data signal) and/or negative (temporal contraction of the egress optical data signal) dispersion introduced by fiber that is 60 km or greater in length, to reduce the sensitivity or OSNR levels of a transceiver in a DWDM located at a field hub or outside plant. More specifically, DCM 108 may be configured to reduce the sensitivity or OSNR level requirement in a photodetector or fiber-optic sensor in the transceiver, which may drastically reduce the cost of the transceivers used in the DWDM located at the field hub or outside plant. Additionally, the DCM 108 may also be tunable. That is, the DCMs can be tuned based on the transmission distance of a signal. For example, if a signal is being transmitted over a 60 km fiber, the tunable DCM may be tuned differently than if the signal were being transmitted over a 5 km fiber. The tunable DCM may be a Fiber Bragg Grating (FBG) type DCM previously described. Submitting the tunable DCM (for example, the FBG) to a temperature gradient may allow a grating chirp to be changed and, accordingly, the dispersion level of the tunable DCM to be tuned. Seven single gratings can be used for producing negative dispersion over a typical range from −800 to −2000 ps/nm or for producing a similar positive dispersion range. This means that the fiber link can be totally managed for dispersion for all distances which may range from 5 km to 60 km, or even greater distances.

In some embodiments, DCM 108 output the downstream optical data signal to WDM 116. WDM 116 may include a portion of a sub circuit that may be used to separate C band signals and L band signals for transmission. For example, the WDM 116 may separate the signals into C band signals and L band signals, may output the C band signals to amplifier 124, and may output the L band signals to amplifier 126. That is, the C band signals and L band signals may be amplified separately. The amplifier 124 and amplifier 126, as well as any other amplifiers described herein, may allow operation over a full transmission spectrum, which may include at least 48 transmission channels. That is, the amplifier 124 and amplifier 126 may be wide-band amplifiers. To support 48 channels, the amplifier 124 and amplifier 126 may optimize gain flatness and noise for the broader channel range (for example, 40 channels included with some of the other OCML systems described herein to 48 channels in OCML headend 101). A gain of the amplifier 124 and amplifier 126 may be based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, the gain of booster amplifier 124 and amplifier 126 may be adjusted based at least in part on the attenuation coefficient and length of fiber that the egress optical data signal will travel. More specifically, in some instances, the gain of booster optical amplifier 124 may be $G=e^{(2\alpha L)}$, where α is the fiber attenuation coefficient, as explained above, and L is the length of the fiber (for example, the length of primary fiber 176 and/or the length of secondary fiber 174). The downstream optical data signals received from the WDM 116 may be amplifier by amplifier 124 and amplifier 126 and may be outputted to WDM 118. The WDM 118 may combine the C and L band signals. The WDM 118 may then output the amplified downstream optical data signals to variable optical attenuator (VOA) 114.

In some embodiments, VOA 114 may receive the amplified downstream optical data signals as an input, and may be used to reduce the power levels of the downstream optical data signals. The power reduction may done by absorption, reflection, diffusion, scattering, deflection, diffraction, and dispersion, of the amplified downstream optical data signals. VOA 114 may have a working wavelength range in which it absorbs all light energy equally. In some embodiments, VOA 114 may utilize a length of high-loss optical fiber, that operates upon its input optical signal power level in such a way that its output signal power level is less than the input level. The variability of the output power level of VOA 114 may be achieved using a fiber coupler, where some of the power is not sent to the port that outputs, but to another port. Another possibility may be to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 114 may be based on some piece of doped fiber, exhibiting absorption within a certain wavelength range. The VOA 114 may also be tuned in synchronization with any of the tunable DCMs (for example, DCM 108). That is the tunable DCMs and the VOA 114 may be tuned for the same transmission distance. The VOA 114 may output the amplified downstream optical data signals to circulator 109.

In some embodiments, circulator 109 may be similar to circulator 104. That is, the circulator 109 may allow additional optical wavelengths to be utilized (for example, the full array of wavelengths included in the 48 total channels) and may enable technologies such as Quasi-Coherent and PAM4 (where the DS and UP wavelengths may be closer together) to be transported in an OCML-MDM infrastructure. The circulator 109 may enable the use of the same wavelength for both downstream and upstream and upstream purposes. Circulators may be one directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. The circulator 10 may output the amplified downstream optical data signals received from the VOA 114 to coexistence element filter 132.

In some embodiments, the coexistence element filter 132 may receive the amplified downstream optical data signals received from the VOA 114, and may also receive signals from the one or more PON connectors 124. The coexistence element filter 132 may be a WDM element that may be used to combine all of these received signals and output one or more of the combined signals on a common output port. The coexistence element filter 132 may allow for different types of data signals to be transmitted on a single network. The coexistence element filter 132 may enable the addition of all the various types of PON signals mentioned in the application to be added to the Ethernet C and L band signals so that all the combined signals can be transported on the pair of two output ports and received by a field MDM. Examples of the coexistence element filter 132 may be provided in FIGS. 4A-4C. The coexistence element filter 132 may output one or more optical data signals to optical switch 134.

In some embodiments, the optical switch 134 may output the one or more optical data signals received from the coexistence element filter 132 to a primary fiber 176 and/or a secondary fiber 174 as well as any number of additional fibers not depicted in the figure). Also included on the primary fiber 176 and/or the secondary fiber 174 may be one or more test points (for example, test points 180 and 182 corresponding with primary fiber 176 and test points 184 and 186 corresponding with secondary fiber 174) and/or one or more Optical Time Domain Reflectometry (OTDR) ports (for example, OTDR ports 188 and/or 10). The test points may be used for monitoring downstream and upstream signals being transmitted over the primary fiber 176 and/or secondary fiber 174. The OTDR ports may allow for continuous monitoring of fibers in the presence of data for fiber degradation or fiber cuts. If a fiber cut happens, the OTDR may enable the location to be determined immediately, significantly reducing outages. OTDR functionality may be enabled via a WDM (for example, WDM 194 and/or WDM 196) and an external port (for example, the OTDR ports 188 and/or 190) on the OCML headend 101 for injecting an OTDR signal (which may be, for example, 1625 or 1650 nm). The WDMs may be located after the optical switch 116 so the OTDR monitoring is independent of which link is carrying downstream traffic. Both the links may always have upstream traffic present, (for example, an MDM 150 may incorporate a 50% splitter which splits the upstream signal evenly between the primary and secondary fiber). The OCML's OTDR injection ports may be specified with a degree of required isolation between the OTDR's 1625/1650 nm and traffic bearing C-band wavelengths. This traffic could be 10G or Coherent 100G/200G, for example. The additional insertion loss associated with the components required to inject the OTDR pulse and to protect transmit/receive equipment from the backscattered or transmitted OTDR signals. The additional insertion losses may be <0.5 dB and thus can be easily accommodated within the system link budget.

In some embodiments, the optical data signals output to the primary fiber 176 and/or secondary fiber 174 may be transmitted to the MDM 150. The optical data signals may then be received at optical splitter 151 as an ingress optical data signal. Optical splitter 151 may also be referred to as a beam splitter, and may comprise one or more quartz substrates of an integrated waveguide optical power distribution device. However, optical splitter 151 may also be any other type of optical splitter as well. Optical splitter 151 may be a passive optical network device. It may be an optical fiber tandem device comprising one or more input terminals and one or more output terminals. Optical splitter 151 may be Fused Biconical Taper (FBT) splitter or Planar Lightwave Circuit (PLC) splitter. Optical splitter 151 may be a balanced splitter wherein optical splitter 151 comprises 2 input fibers and one or more output fibers over which the ingress optical data signal may be spread proportionally. In some embodiments, the ingress optical data signal may not be spread proportionally across the output fibers of optical splitter 151. In some embodiments, optical splitter 151 may comprise 2 input fibers and 2 output fibers. A first input fiber of optical splitter 151 may be connected to primary fiber 176 and a second input fiber of optical splitter 151 may be connected to secondary fiber 174.

A first output fiber of optical splitter 151 may be connected to a coexistence filter element 152. The coexistence filter element 152 may be similar to coexistence filter element 132, coexistence filter element 232, or any other coexistence filter element described herein. A second output fiber of optical splitter 151 may be connected to a DWDM 153. Because the downstream optical data signals may be multi-wavelength downstream optical data signal, DWDM 153 may demultiplex the downstream optical data signals into individual optical data signals in accordance with the individual wavelengths of the one or more downstream optical data signals. More specifically, the one or more downstream optical data signals may be demultiplexed into twenty four optical data signals (or any other number of optical data signals), each of which may have a unique wavelength. DWDM 153 may output each of the twenty four optical data signals to each of the downstream transponders 154. Each of the transponders may be in a RPD (not shown) and may convert a received corresponding optical data signal, of the optical data signals, into a corresponding electrical signal. More specifically, a first transceiver in each of the downstream transponders 154 may convert each of the twenty four optical data signals into the corresponding electrical signal. Each of the downstream transponders 154 may also comprise a second transceiver that may convert the corresponding electrical signal into a SONET/SDH optical data signal with a corresponding SONET/SDH optical data signal wavelength. In some embodiments, each of the twenty four corresponding SONET/SDH optical data signals may have the same wavelength. In other embodiments, each of the twenty four corresponding SONET/SDH optical data signals may have unique wavelengths.

The operation of MDM 153 may be further described by way of the processing of an upstream optical data signal transmitted to headend 101. Each of the upstream transponders 155 of the DWDM 153 may receive a SONET/SDH optical data signal and may convert the SONET/SDH optical data signal into an electrical signal. Each of the upstream transponders 155 may receive the SONET/SDH optical data signal from the RPD. The RPD may also convert one or more electrical signals into the SONET/SDH optical data signal.

More specifically, a first transceiver in the upstream transponders 155 may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty four upstream transponders 155 may each receive a SONET/SDH optical data signal, and each of the twenty four upstream transponders 155 may convert the received SONET/SDH optical data signal into a corresponding second optical data signal, wherein each of the corresponding second optical data signals has a unique wavelength. That is, the wavelength of each of the corresponding second optical data signals may be distinguishable from the wavelength of any of the other corresponding second optical data signals. Thus upstream transponders 155 may generate twenty four corresponding second optical data signals each of which has a unique wavelength.

DWDM 153 may receive twenty corresponding second optical data signals as an input and output a multi-wavelength upstream optical data signal comprising the twenty four corresponding second optical data signals. More specifically, DWDM 153 may multiplex the twenty four corresponding second optical data signals onto the fiber connecting DWDM 153 and optical splitter 151, wherein the twenty multiplexed corresponding second optical data signals compose the multi-wavelength downstream optical data signal. The multi-wavelength optical data signal may have a wavelength comprising the twenty four wavelengths of the twenty four corresponding second optical data signals. Additionally, coexistence filter element 152 may receive one or more upstream signals as well (such as, for example, GPON, 25G/50G-PON, XG-PON1, NG-PON2, or any other type of signal). These signals may also be outputted by the coexistence filter element 152 to the optical splitter 151. Optical splitter 151 may receive one or more upstream PON signals from the coexistence filter element 152, and may also receive the multi-wavelength upstream optical data signal from the DWDM 153. Optical splitter 151 may output an egress optical data signal, which may be a multi-wavelength optical data signal. Optical splitter 151 may output the egress optical data signal onto primary fiber 176 or secondary fiber 174 connecting the optical splitter 151 to the OCML headend 101.

Figure 1B:
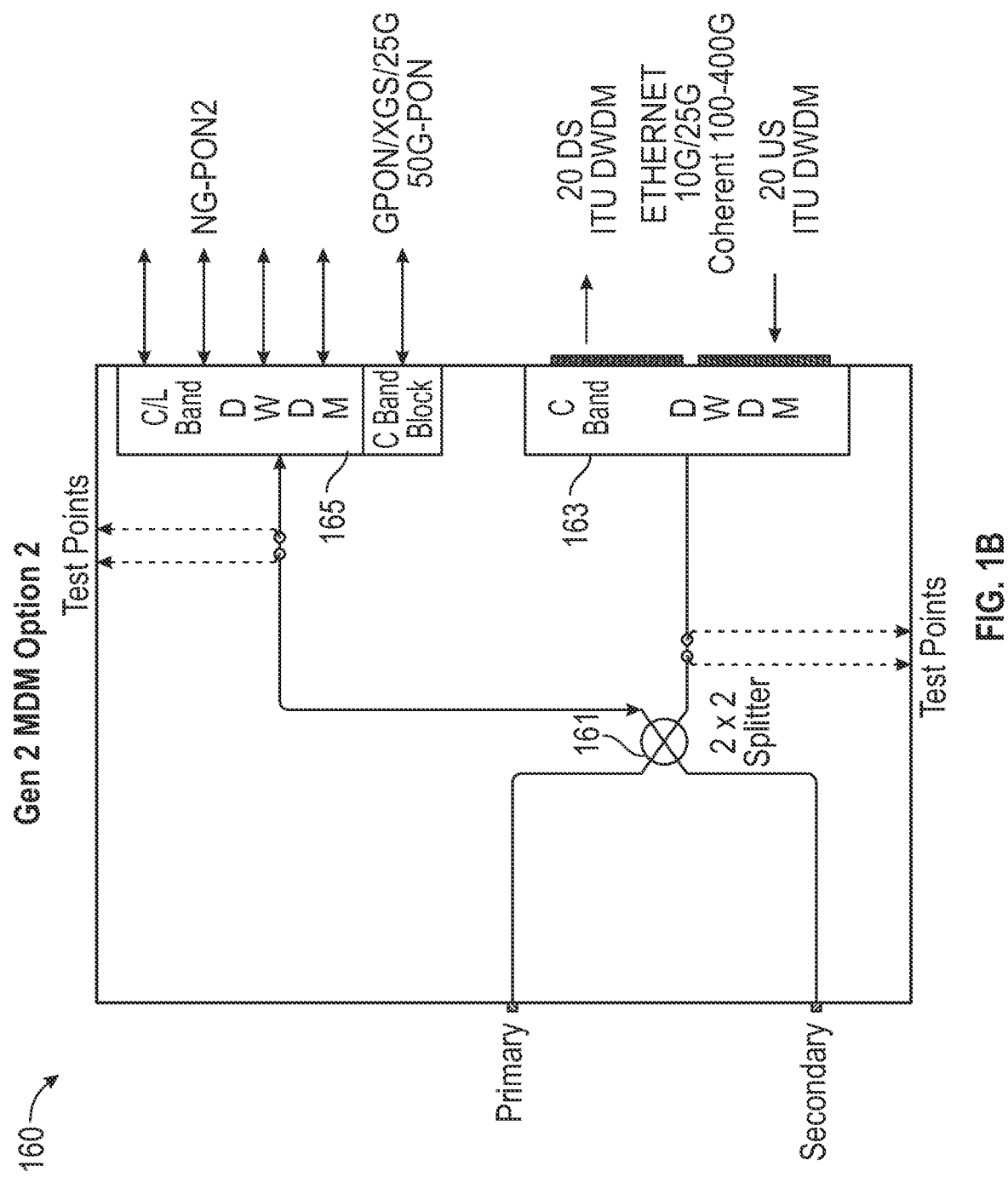
FIG. 1B depicts an alternative embodiments of a multiplexer-demultiplexer (MDM), in accordance with the disclosure.

In some embodiments, FIG. 1B depicts another example embodiments of a MDM 160. The MDM 160 may be used in place of MDM 150, MDM 250, or any other MDM described herein. MDM 160 may include similar elements as MDM 150 and MDM 250. For example, optical splitter 161 may be similar to optical splitter 151 or 251 and/or DWDM 163 may be similar to DWDM 153 and/or DWDM 253. However, the MDM 160 may differ from MDM 150 and MDM 250 in that MDM 160 may include a second DWDM 165. Including the second DWDM 165 may allow for a NG-PON2 DWDM passive to the MDM to be added, so that an external DWDM would not be required to separate the NG-PON2 downstream and upstream wavelengths. Incorporating the DWDM 165 into the MDM 160 reduces the overall loss budget and helps with longer distance signal transmissions.

Returning to FIG. 1A, the operation of OCML headend 101 may also be described by way of the processing of upstream optical data signals received at OCML headend 101 from a field hub or outside plant. That is, processing in the opposite signal flow direction as downstream signal processing described above. In some instances, the processing of upstream optical data signals may involve the reverse process of the processing of downstream optical data signals as described above. That is, the processing may occur starting from the primary fiber 176 and/or secondary fiber 174 and end with the DWDM 102. In some instances, one difference between upstream and downstream processing may be that WDM 120, WDM 122, amplifier 128, amplifier 130, VOA 112, and DCM 110 may be used. Additionally, the functionality of the components involved in the upstream processing may be the same or similar to the functionality of the components involved in the downstream processing.

In processing of upstream optical data signals, a multi-wavelength ingress optical data signal, comprising one or more of a 10-400 GbE optical data signal, XGPON/10GE-PON optical data signal, and/or GPON optical data signal (as well as any other data signal), may be an upstream optical data signal received on primary fiber 176 or secondary fiber 174 depending on the position of switch 134. The multi-wavelength ingress optical data signal may be received by coexistence filter element 132. The Coexistence filter element 132 may demultiplex one or more 10-400 GbE optical data signals, XGPON/10GEPON optical data signals, and/or GPON optical data signals (as well as any other type of signal) from ingress optical data signal. Coexistence filter element 132 may transmit the one or more PON signals (for example, GPON, 25G/50G-PON, XG-PON1, NP-PON2, as well as any other types of PON signals) to PON connectors 125. Coexistence filter element 132 may transmit the one or more 10-400 GbE optical data signals to circulator 106. The operation of the circulator 109 in upstream signal transmission may be the same as during downstream signal transmission. From circulator 106, the signal may be transmitted to WDM 122. Similarly to WDM 116 in the downstream direction, WDM 122 may be used to separate C band signals and L band signals. C band signals may be provided to optical pre-amplifier 128, and L band signals may be provided to optical pre-amplifier 130, or vice versa. The optical pre-amplifier 128 and optical pre-amplifier 130 may then provide amplified signals to the WDM 120. WDM 120 may then provide the amplified signals to VOA 112, which may function similarly to VOA 114 in the downstream direction. VOA 114 may then provide the amplified signals to DCM 110.

In some embodiments, DCM 110 may be configured to balance positive and/or negative dispersion that may be introduced to a SONET/SDH egress optical data signal that may exit OCML headend 101 from upstream transponders 188. The SONET/SDH egress optical data signal may be an upstream signal from a field hub or outside plant destined for a MTC. For example, a customer premise may be connected to the field hub or outside plant and may send one or more packets via a SONET/SDH network to the field hub or outside plant which may in turn transmit the one or more packets using 10-400 GbE optical data signals to OCML headend 101. The one or more packets may be destined for a company web server connected to the MTC via a backbone network. Because OCML headend 101 may be collocated in a STC that is connected to the MTC via an optical ring network, wherein the connection between the STC and MTC is an SONET/SDH optical network connection, DCM 110 may be configured to compensate for positive and/or negative dispersion on the SONET/SDH optical network connection. That is DCM 110 may be configured to reduce temporal broadening of the SONET/SDH ingress optical data signal or temporal contraction of the SONET/SDH ingress optical data signal.

Figure 2:
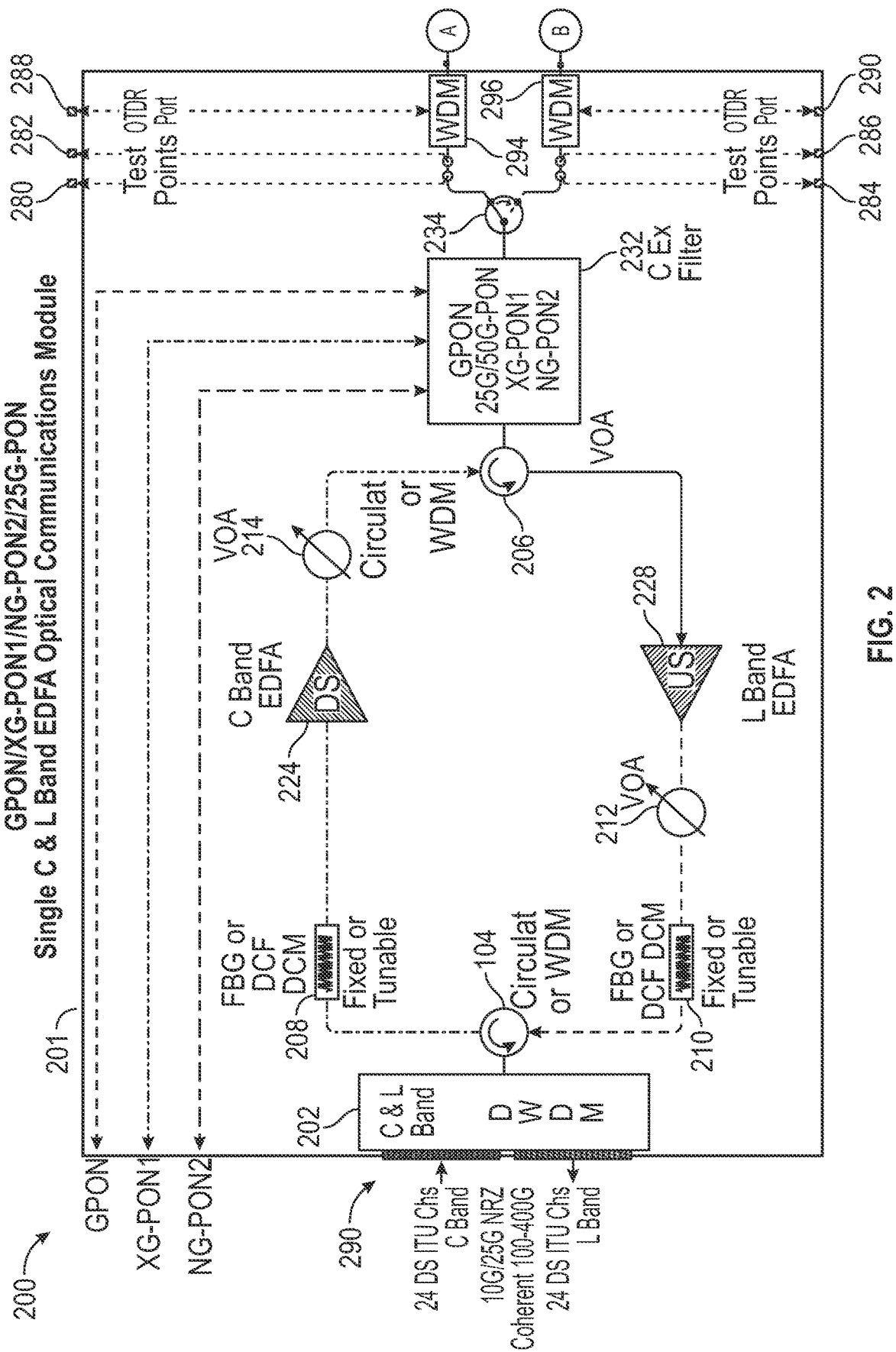
FIG. 2 depicts an example system architecture of an Optical Communications Module Link (OCML) Extender, in accordance with the disclosure.
Figure 2:
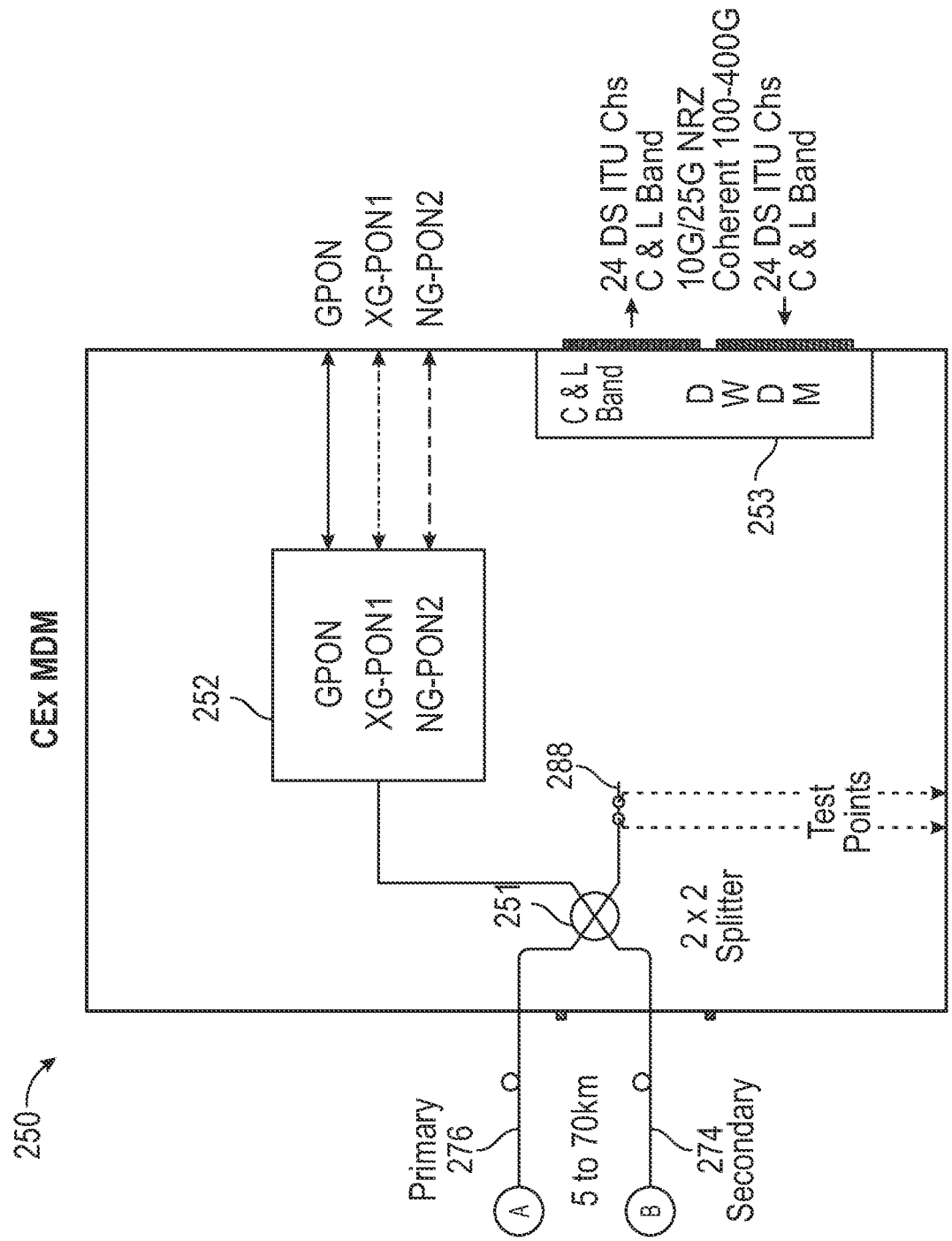

In some embodiments, circulator 104 may receive the optical data signals from the DCM 110 and may provide the optical data signals to DWDM 102. DWDM 102 may demultiplex one or more 10-400 GbE optical data signals. Because the optical data signals received from the circulator 104 may be a dispersion compensated amplified version of the multi-wavelength ingress optical data signal, DWDM 102 may demultiplex the one or more optical data signals into individual optical data signals in accordance with the individual wavelengths of any 10-400 GbE optical data signals in the multi-wavelength ingress optical data signal. More specifically, the optical data signals received from the circulator 104 may be demultiplexed into twenty four 10-400 GbE optical data signals, each of which may have a unique wavelength. DWDM 102 may output each of the twenty 10-400 GbE optical data signals to each of the transponders of upstream transponders 188. Each of the transponders of upstream transponders 188 may convert a received corresponding 10-400 GbE optical data signal, of the 10-400 GbE optical data signals, into a corresponding electrical signal. More specifically, a first transceiver in each of the transponders may convert each of the twenty four 10-400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty four corresponding SONET/SDH optical data signals may have the same wavelength. In other embodiments, each of the twenty four corresponding SONET/SDH optical data signals may have unique wavelengths. The twenty four transponders of upstream transponders 188 may transmit the twenty four SONET/SDH optical data signals to the MTC on the SONET/SDH optical network connection. It should be noted that while 10-400 GbE optical data signals are described above, this is merely for exemplary purposes, and any other type of signal may be used as well. FIG. 2 depicts an example system 200 architecture of an OCML headend 201 according to at least one embodiment of the disclosure. OCML headend 201 may be similar to OCML headend 101 and may include some similar components. For example, as shown in FIG. 2, OCML headend 201 may comprise one or more DWDMs (for example, DWDM 202), one or more circulators (for example, circulator 204 and 206), one or more DCMs (for example, DCM 208 and 210) (which may be tunable DCMs), one or more VOAs (for example, VOA 212 and/or VOA 214), one or more filtering elements 132, and one or more optical switches (for example, optical switch 134) to feed a primary optical fiber (for example, Primary Fiber 136) or secondary (backup) optical fiber (for example, Secondary Fiber 138) (as well as any number of additional fibers). The headend 201 may differ from the OCML headend 101 in that the OCML headend 201 may include optical amplifier 216 and optical amplifier 218 instead of including four WDMs and four optical amplifiers used to separate C and L band signals. The OCML headend 201 configuration depicted in FIG. 2 may be used when only one of the C or L band is used for downstream data transmissions and the other band is used for upstream data transmissions (for example, the C band could be used exclusively for downstream transmission and the L band cold be used exclusively for upstream transmissions, or vice versa). The OCML headend 201 configuration depicted in FIG. 2 may also be used when only one of the C or L band is used for both downstream and upstream transmissions. For example, a portion of the C band could be used for downstream transmissions and a portion of the C band could be used for upstream transmissions (the same may apply to only using the L band instead of the C band). Given that only one of the L band or C band is used for downstream and/or upstream transmissions, the OCML headend 201 may only require one amplifier 224 in the downstream direction and one amplifier 228 in the upstream direction. This may be because signals in only one band may need amplification in the OCML headend 201 instead of amplifying both C and L band signals in the OCML headend 101. The OCML headend 201 may also differ from OCML headend 101 in instances where only one of the C band or L band is used for both downstream and upstream transmissions. The OCML headend 201 may differ in these instances in that DWDM 202 may include twenty four downstream transponders 290 and twenty four upstream transponders 288 (however, any other number of downstream and/or upstream transponders may be used in OCML headend 201 as well).

Figure 3:
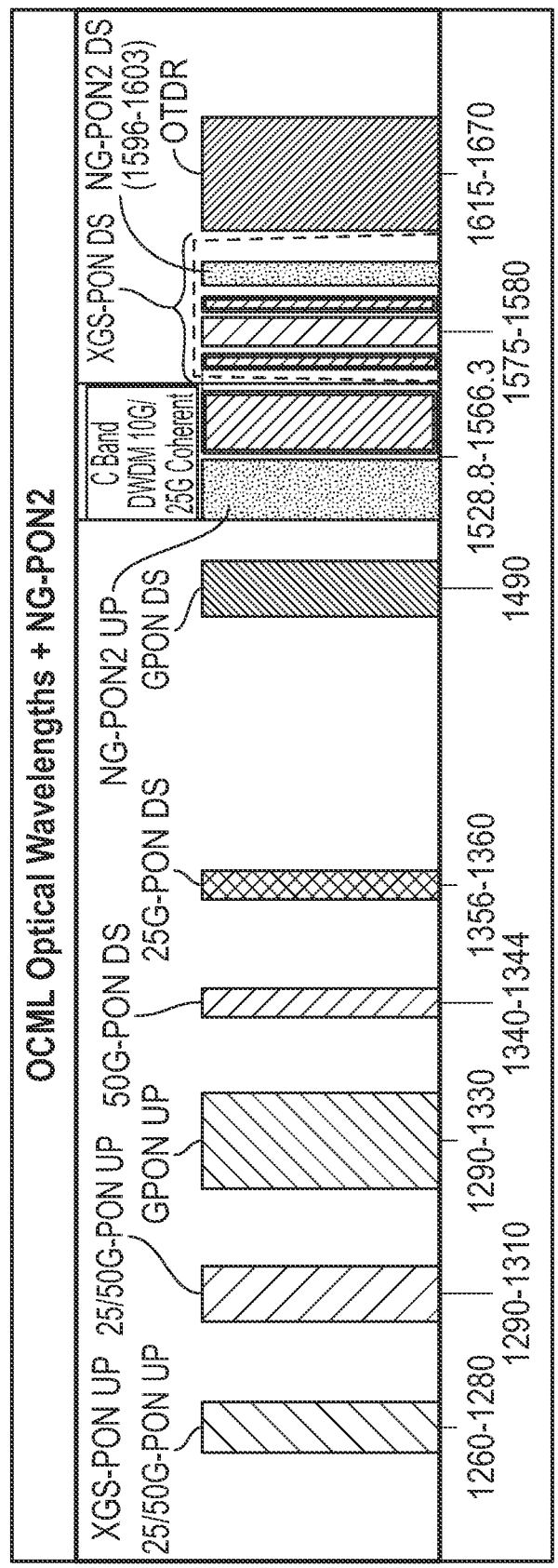
FIG. 3 depicts an example optical wavelength spectrum, in accordance with the disclosure.

FIG. 3 depicts an example optical wavelength spectrum 300, in accordance with the disclosure. The wavelength spectrum 300 may exemplify some of the wavelengths that are used to transmit particular signals using any of the OCMLs described herein (for example, OCML headend 101, OCML headend 201, or any other OCML). For example, the wavelength spectrum 300 may depict that Ethernet signals (for example, 10G to 400G) may be transmitted using the C Band including twenty four wavelengths ranging between 1547.72 and 1566.31. Similarly, L Band usage may be divided into two portions: twelve wavelengths between 1582.85-1593.79 and twelve wavelengths between 1564.68 and 1573.71. The remaining portion of the L band may be used for XGX-PON downstream and NG-PON2 downstream transport. This division of wavelengths for transporting particular types of signals may merely be exemplary, however, any other wavelengths and/or number of wavelengths to transmit any type of signal described herein or otherwise may be used as well.

Figure 4A:
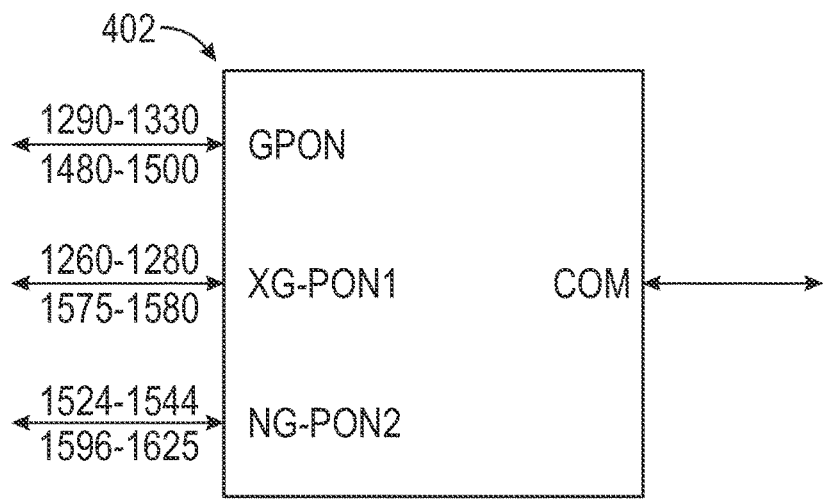
FIGS. 4A-4C depict example embodiments of a filtering component of the OCML, in accordance with the disclosure.
Figure 4B:
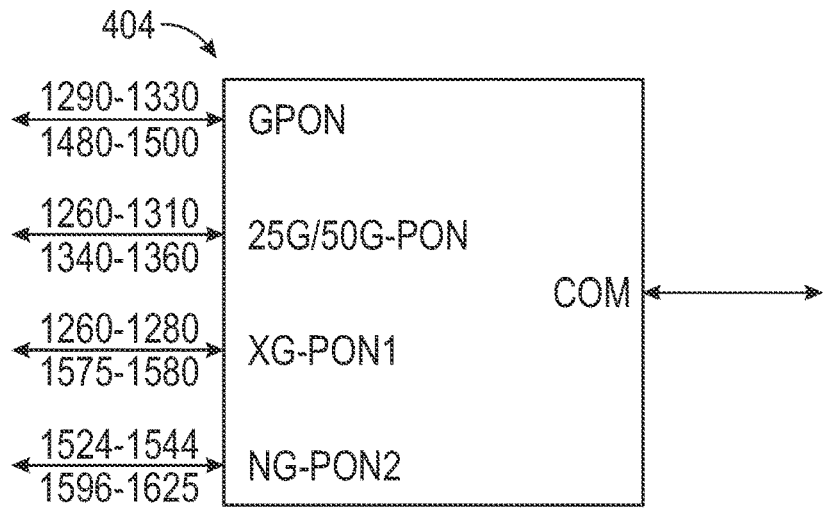
Figure 4C:
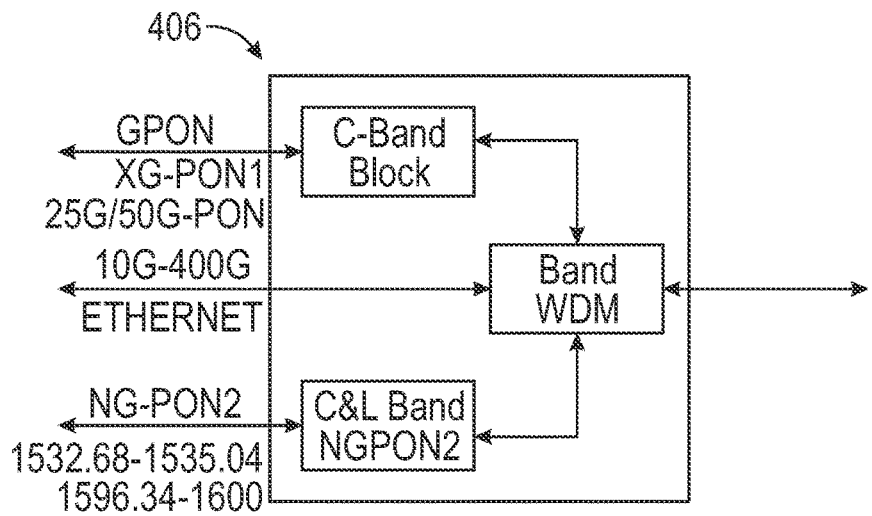

FIGS. 4A-4C depict example embodiments of a filtering component of the OCML (for example, coexistence filtering element 132 or coexistence filtering element 232), in accordance with the disclosure. FIG. 4A may depict a first example embodiment of the filtering element 402. The filtering element 402 may receive as inputs various signal types (for example, GPON, XG-PON1, and/or NG-PON2 signals) and may output the signals on a common port. The signal inputs may be filtered so that only signals in the desired wavelength ranges for the individual signal types may be passed through the filtering element 402. For example, the filtering element 402 may allow wavelengths in the range of 1290-1300 nm and 1480-1500 nm to pass through for GPON signals, wavelengths in the range of 1260-1280 nm and 1575-1580 nm to pass through for XG-PON1 signals, and wavelengths in the range of 1524-1544 nm and 1596-1625 nm to pass through for NG-PON2 signals. FIG. 4B may depict a second example embodiment of a filtering element 404. The filtering element 404 may be similar to filtering element 404, but may also include 25G/50G-PON signals as inputs to be filtered by the filtering element 404 as well. FIG. 4C may depict a third example embodiment of a filtering element 406. The filtering element 406 may differ from the filtering element 402 and/or filtering element 404 in that filtering element 406 may include a C-band wavelength filter for GPON, XG-PON1, and/or 25G/50G-PON signal inputs.

Example Method

Figure 5:
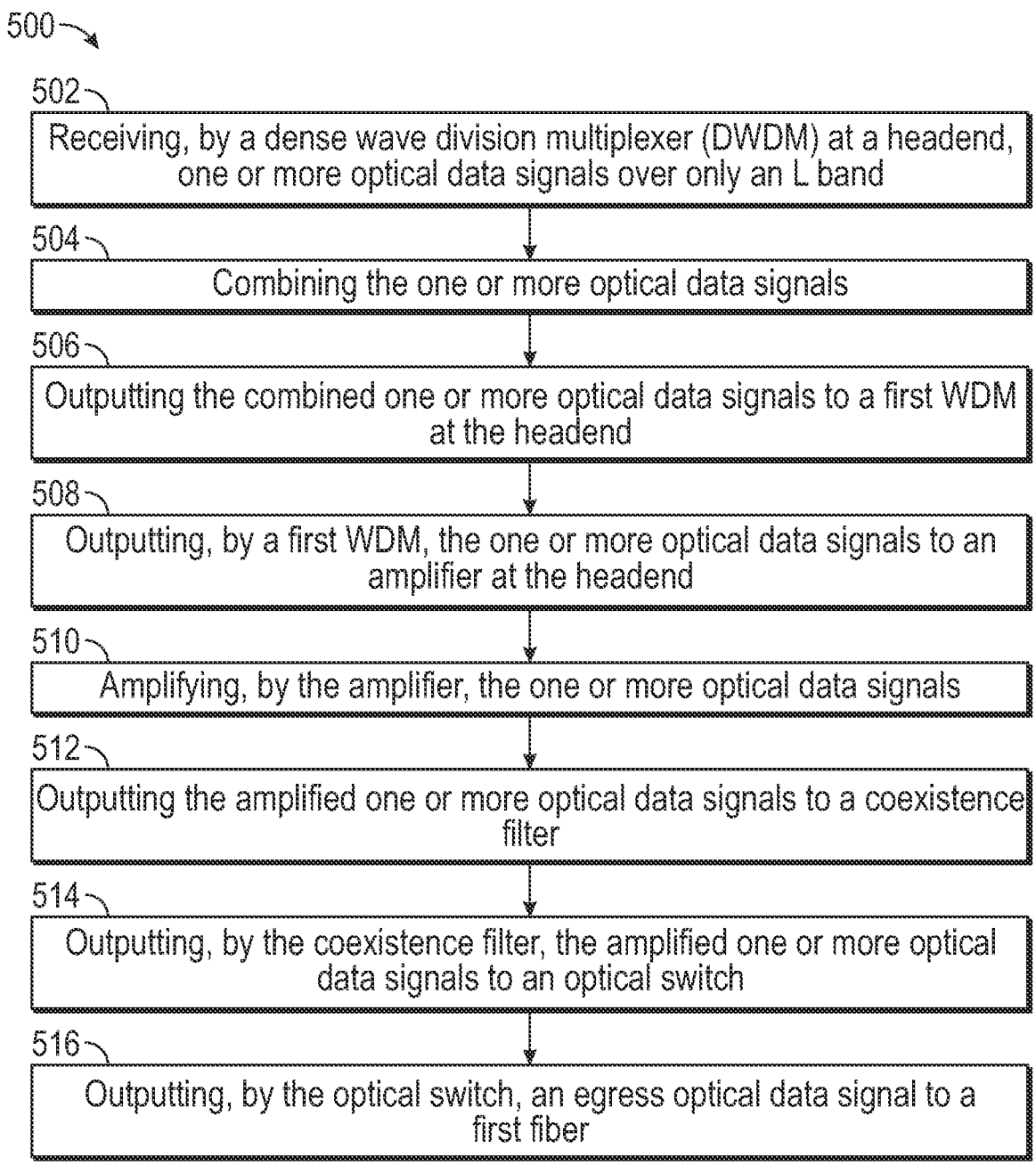
FIG. 5 depicts an example method, in accordance with the disclosure.

FIG. 5 is an example method 500. At block 502 of the method 500 in FIG. 5, the method may include receiving, by a dense wave division multiplexer (DWDM) at a headend, one or more optical data signals over only an L band. Block 504 of the method may include combining the one or more optical data signals. Block 506 of the method may include outputting the combined one or more optical data signals to a first WDM at the headend. Block 508 of the method may include outputting, by a first WDM, the one or more optical data signals to an amplifier at the headend. Block 510 of the method may include amplifying, by the amplifier, the one or more optical data signals. Block 512 of the method may include outputting the amplified one or more optical data signals to a coexistence filter. Block 514 of the method may include outputting, by the coexistence filter, the amplified one or more optical data signals to an optical switch. Block 516 of the method may include outputting, by the optical switch, an egress optical data signal to a first fiber.

The operations described and depicted in the illustrative process flow of FIG. 5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 5 may be performed.

Example Computing Device

Figure 6:
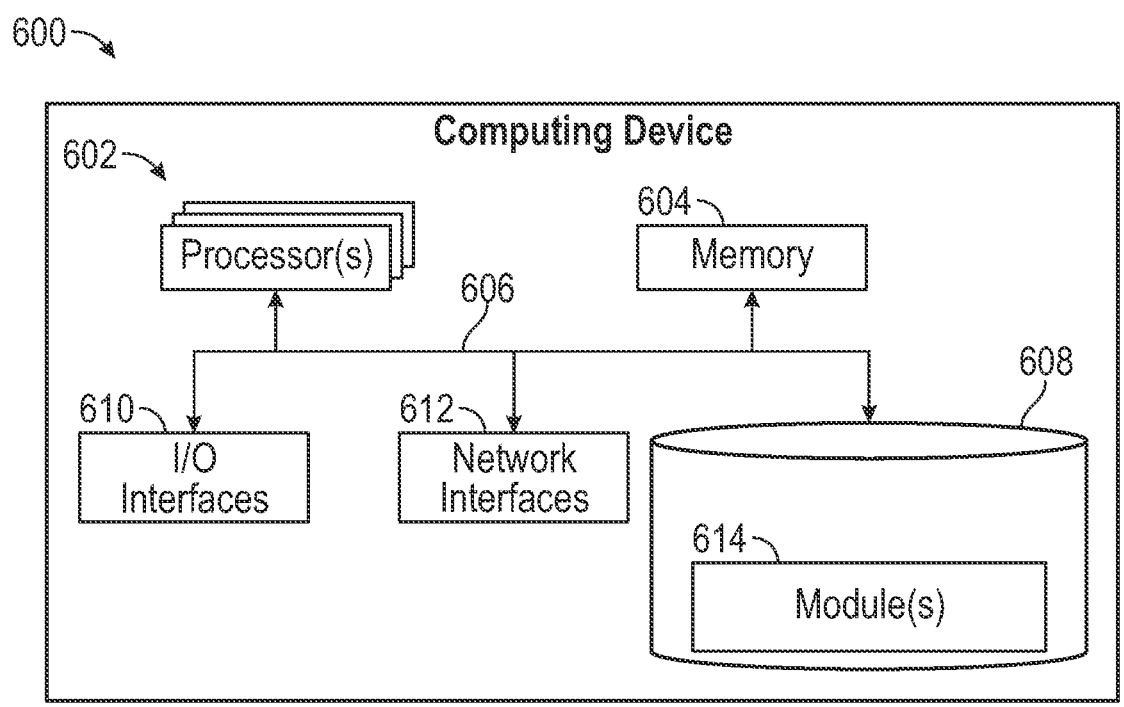
FIG. 6 depicts an example computing system, in accordance with the disclosure.

FIG. 6 illustrates an example computing device 600, in accordance with one or more embodiments of this disclosure. The computing device 600 may be representative of any devices described herein that may perform any active processing operations. The computing device 600 may include at least one processor 602 that executes instructions that are stored in one or more memory devices (referred to as memory 604). The instructions can be, for instance, instructions for implementing functionality described as being carried out by one or more modules and systems disclosed above or instructions for implementing one or more of the methods disclosed above. The processor(s) 602 can be embodied in, for example, a CPU, multiple CPUs, a GPU, multiple GPUs, a TPU, multiple TPUs, a multi-core processor, a combination thereof, and the like. In some embodiments, the processor(s) 602 can be arranged in a single processing device. In other embodiments, the processor(s) 602 can be distributed across two or more processing devices (for example, multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (for example, manufactured) to perform the functions described herein.

The processor(s) 602 can access the memory 604 by means of a communication architecture 606 (for example, a system bus). The communication architecture 606 may be suitable for the particular arrangement (localized or distributed) and type of the processor(s) 602. In some embodiments, the communication architecture 606 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 604 also can retain data, such as any ledger 166 information, among other data.

Each computing device 600 also can include mass storage 608 that is accessible by the processor(s) 602 by means of the communication architecture 606. The mass storage 608 can include machine-accessible instructions (for example, computer-readable instructions and/or computer-executable instructions). In some embodiments, the machine-accessible instructions may be encoded in the mass storage 608 and can be arranged in components that can be built (for example, linked and compiled) and retained in computer-executable form in the mass storage 608 or in one or more other machine-accessible non-transitory storage media included in the computing device 600. Such components can embody, or can constitute, one or many of the various modules disclosed herein. Execution of the modules, individually or in combination, by at least one of the processor(s) 602, can cause the computing device 600 to perform any of the operations described herein.

Each computing device 600 also can include one or more input/output interface devices 610 (referred to as I/O interface 610) that can permit or otherwise facilitate external devices to communicate with the computing device 600. For instance, the I/O interface 610 may be used to receive and send data and/or instructions from and to an external computing device.

The computing device 600 also includes one or more network interface devices 612 (referred to as network interface(s) 612) that can permit or otherwise facilitate functionally coupling the computing device 600 with one or more external devices. Functionally coupling the computing device 600 to an external device can include establishing a wireline connection or a wireless connection between the computing device 600 and the external device. The network interface devices 612 can include one or many antennas and a communication processing device that can permit wireless communication between the computing device 600 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 612 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (for example, data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (for example, data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (for example, computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. An optical communication module link extender (OCML) system comprising:
   a dense wave division multiplexer (DWDM) at a headend that is configured to receive one or more downstream optical data signals only over a C band or only over an L band, combine the one or more downstream optical data signals, and output a combined optical data signal;
   a variable optical attenuator (VOA) at the headend that is configured to receive the combined optical data signal, adjust a power of the combined optical data signal, and output a third optical data signal;
   a circulator or WDM at the headend that is configured to receive the third optical data signal from the VOA and output a fourth optical data signal to a coexistence filter;
   the coexistence filter at the headend that is configured to receive the fourth optical data signal from the circulator or WDM and an NG-PON2 signal from one or more PON connectors separate from one or more inputs to the DWDM, wherein the coexistence filter is further configured to combine the NG-PON2 signal with the fourth optical data signal into a fifth optical data signal, and output the fifth optical data signal to an optical switch; and
   the optical switch at the headend that is configured to receive the fifth optical data signal from the coexistence filter and output the fifth optical data signal to a first fiber, wherein the optical switch is further configured to receive a first upstream optical data signal only over an L band, and a second upstream optical data signal only over a C band, and output the first upstream optical data signal or the second upstream optical data signal, and wherein the DWDM is further configured to receive the first upstream optical data signal or the second upstream optical data signal via the coexistence filter and output the first upstream optical data signal or the second upstream optical data signal.

2. The system of claim 1, further comprising:
   A second circulator or WDM communicatively coupled to the DWDM that is configured to receive the combined optical data signal from the DWDM and output the combined optical data signal to a dispersion compensation module (DCM).

3. The system of claim 2, wherein the DCM is a tuneable DCM or fixed value DCM and is configured to receive the combined optical data signal from the second circulator or WDM and output the combined optical data signal.

4. The system of claim 2, wherein the DCM is a tuneable DCM or fixed value DCM and is configured to receive the combined optical data signal from the second circulator or WDM and output the combined optical data signal.

5. The system of claim 1, wherein the optical switch is further configured to output the fifth optical data signal on a secondary fiber based at least in part on an impairment to the primary fiber.

6. The system of claim 1, wherein the optical switch is further configured to output the fifth optical data signal on a secondary fiber based at least in part on an impairment to the primary fiber.

7. A method comprising:
   receiving, by a dense wave division multiplexer (DWDM) at a headend, one or more optical data signals over only an L band;
   combining the one or more optical data signals into a combined optical data signal;
   outputting the combined optical data signal to a variable optical attenuator (VOA) at the headend;
   adjusting, by the VOA, a power of the combined optical data signal;
   outputting, by the VOA, a third optical data signal to a circulator or WDM at the headend;

outputting, by the circulator or WDM, a fourth optical data signal to a coexistence filter at the headend;

receiving, by the coexistence filter, the fourth optical data signal from the WDM and an NG-PON2 signal from one or more PON connectors separate from one or more inputs to the DWDM;

combining the NG-PON2 signal with the fourth optical data signal into a fifth optical data signal;

output the fifth optical data signal to an optical switch;

outputting, by the coexistence filter, the fifth optical data signal to an optical switch; and outputting, by the optical switch, the fifth optical data signal to a first fiber, wherein the optical switch is further configured to receive a first upstream optical data signal only over a C band, and a second upstream optical data signal only over an L band, and output the first upstream optical data signal or the second upstream optical data signal, and wherein the DWDM is further configured to receive the first upstream optical data signal or the second upstream optical data signal via the coexistence filter and output the first upstream optical data signal or the second upstream optical data signal.

8. The method of claim 7, further comprising:

receiving, by a second circulator or WDM communicatively coupled to the DWDM, the combined optical data signal from the DWDM; and outputting the combined optical data signal to a dispersion compensation module (DCM).

9. The method of claim 8, wherein the DCM is a tuneable DCM or fixed value DCM and is configured to receive the combined optical data signal from the second circulator or WDM and output the combined optical data signal.

10. A device comprising:

a dense wave division multiplexer (DWDM) at a headend that is configured to receive one or more downstream optical data signals only over a C band, combine the one or more downstream optical data signals, and output a combined optical data signal;

a variable optical attenuator (VOA) at the headend that is configured to receive the combined optical data signal, adjust a power of the combined optical data signal, and output a third optical data signal;

a circulator or WDM at the headend that is configured to receive the third optical data signal from the VOA and output a fourth optical data signal to a coexistence filter;

the coexistence filter at the headend that is configured to receive the fourth optical data signal from the WDM and an NG-PON2 signal from one or more PON connectors separate from one or more inputs to the DWDM, wherein the coexistence filter is further configured to combine the NG-PON2 signal with the fourth optical data signal into a fifth optical data signal, and output the fifth optical data signal to an optical switch; and the optical switch at the headend that is configured to receive the fifth optical data signal from the coexistence filter and output the fifth optical data signal to a first fiber, wherein the optical switch is further configured to receive a first upstream optical data signal only over an L band, and a second upstream optical data signal only over a C band, and output the first upstream optical data signal or the second upstream optical data signal, and wherein the DWDM is further configured to receive the first upstream optical data signal or the second upstream optical data signal via the coexistence filter and output the first upstream optical data signal or the second upstream optical data signal.

\* \* \* \* \*